(12) United States Patent
Lee et al.

(10) Patent No.: US 10,593,012 B2
(45) Date of Patent: Mar. 17, 2020

(54) METHOD AND APPARATUS FOR GENERATING AND ENCODING PROJECTION-BASED FRAME WITH 360-DEGREE CONTENT REPRESENTED IN PROJECTION FACES PACKED IN SEGMENTED SPHERE PROJECTION LAYOUT

(71) Applicant: MEDIATEK INC., Hsin-Chu (TW)

(72) Inventors: Ya-Hsuan Lee, Hsinchu (TW); Hung-Chih Lin, Hsinchu (TW); Jian-Liang Lin, Hsinchu (TW); Shen-Kai Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 50 days.

(21) Appl. No.: 15/927,028

(22) Filed: Mar. 20, 2018

(65) Prior Publication Data

US 2018/0276788 A1 Sep. 27, 2018

Related U.S. Application Data

(60) Provisional application No. 62/474,704, filed on Mar. 22, 2017, provisional application No. 62/517,217, (Continued)

(51) Int. Cl.
*G06T 3/00* (2006.01)
(52) U.S. Cl.
CPC .......... *G06T 3/0018* (2013.01); *G06T 3/0062* (2013.01); *G06T 2219/2016* (2013.01)
(58) Field of Classification Search
None
See application file for complete search history.

(56) References Cited

U.S. PATENT DOCUMENTS

2001/0056574 A1  12/2001  Richards
2015/0341552 A1  11/2015  Chen
(Continued)

FOREIGN PATENT DOCUMENTS

CN  105812759 A  7/2016
CN  106162207 A  11/2016
(Continued)

OTHER PUBLICATIONS

"International Search Report" dated May 9, 2018 for International application No. PCT/CN2018/079734, International filed:Mar. 21, 2018.

*Primary Examiner* — Yi Wang
(74) *Attorney, Agent, or Firm* — Winston Hsu

(57) ABSTRACT

A video processing method includes receiving an omnidirectional content corresponding to a sphere, generating a projection-based frame according to at least the omnidirectional content and a segmented sphere projection (SSP) format, and encoding, by a video encoder, the projection-based frame to generate a part of a bitstream. The projection-based frame has a 360-degree content represented by a first circular projection face, a second circular projection face, and at least one rectangular projection face packed in an SSP layout. A north polar region of the sphere is mapped onto the first circular projection face. A south polar region of the sphere is mapped onto the second circular projection face. At least one non-polar ring-shaped segment between the north polar region and the south polar region of the sphere is mapped onto said at least one rectangular projection face.

18 Claims, 17 Drawing Sheets

Related U.S. Application Data filed on Jun. 9, 2017, provisional application No. 62/530,367, filed on Jul. 10, 2017.

(56) References Cited

U.S. PATENT DOCUMENTS

| | | | |
|---|---|---|---|
| 2018/0205934 A1* | 7/2018 | Abbas | H04N 19/40 |
| 2018/0276789 A1* | 9/2018 | Van Der Auwera | H04N 19/597 |

FOREIGN PATENT DOCUMENTS

| | | | |
|---|---|---|---|
| CN | 106357976 A | | 1/2017 |
| CN | 106358033 A | * | 1/2017 |
| CN | 106358033 A | | 1/2017 |
| JP | 2001-298652 A | | 10/2001 |

* cited by examiner

METHOD AND APPARATUS FOR GENERATING AND ENCODING PROJECTION-BASED FRAME WITH 360-DEGREE CONTENT REPRESENTED IN PROJECTION FACES PACKED IN SEGMENTED SPHERE PROJECTION LAYOUT

CROSS REFERENCE TO RELATED APPLICATIONS

This application claims the benefit of U.S. provisional application No. 62/474,704 filed Mar. 22, 2017, U.S. provisional application No. 62/517,217 filed Jun. 9, 2017, and U.S. provisional application No. 62/530,367 filed Jul. 10, 2017, which are incorporated herein by reference.

FIELD OF INVENTION

The present invention relates to processing omnidirectional image/video content, and more particularly, to a method and an apparatus for generating and encoding a projection-based frame with a 360-degree content represented in projection faces packed in a segmented sphere projection (SSP) layout.

BACKGROUND

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional image/video content corresponding to the sphere is transformed into a sequence of images, each of which is a projection-based frame with a 360-degree image/video content represented by one or more projection faces arranged in a 360-degree Virtual Reality (360 VR) projection layout, and then the sequence of the projection-based frames is encoded into a bitstream for transmission.

However, it is possible that the employed 360 VR projection layout is not compact, and/or has many image content discontinuity edges that are caused by packing of projection faces. Encoding a projection-based frame with such a 360 VR projection layout may have poor coding efficiency, and/or may have poor image quality after compression.

SUMMARY

One of the objectives of the claimed invention is to provide a method and an apparatus for generating and encoding a projection-based frame with a 360-degree content represented in projection faces packed in a segmented sphere projection (SSP) layout. In addition, sphere rotation may be performed upon a sphere before the omnidirectional image/video content of the sphere is projected using an SSP format, thereby improving the coding efficiency. Further, certain features (e.g., guard bands and/or padding) may be employed by the proposed SSP layout, thereby improving the image quality after compression.

According to a first aspect of the present invention, an exemplary video processing method is disclosed. The exemplary video processing method includes: receiving an omnidirectional content corresponding to a sphere; generating a projection-based frame according to at least the omnidirectional content and a segmented sphere projection (SSP) format, and encoding, by a video encoder, the projection-based frame to generate a part of a bitstream. The projection-based frame has a 360-degree content represented by a first circular projection face, a second circular projection face, and at least one rectangular projection face packed in an SSP layout. A north polar region of the sphere is mapped onto the first circular projection face. A south polar region of the sphere is mapped onto the second circular projection face. At least one non-polar ring-shaped segment between the north polar region and the south polar region of the sphere is mapped onto the at least one rectangular projection face.

According to a second aspect of the present invention, an exemplary video processing apparatus is disclosed. The exemplary video processing apparatus includes a conversion circuit and a video encoder. The conversion circuit is arranged to receive an omnidirectional content corresponding to a sphere, and generate a projection-based frame according to the omnidirectional content and a segmented sphere projection (SSP) format, wherein the projection-based frame has a 360-degree content represented by a first circular projection face, a second circular projection face, and at least one rectangular projection face packed in an SSP layout, a north polar region of the sphere is mapped onto the first circular projection face, a south polar region of the sphere is mapped onto the second circular projection face, and at least one non-polar ring-shaped segment between the north polar region and the south polar region of the sphere is mapped onto said at least one rectangular projection face. The video encoder is arranged to encode the projection-based frame to generate a part of a bitstream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
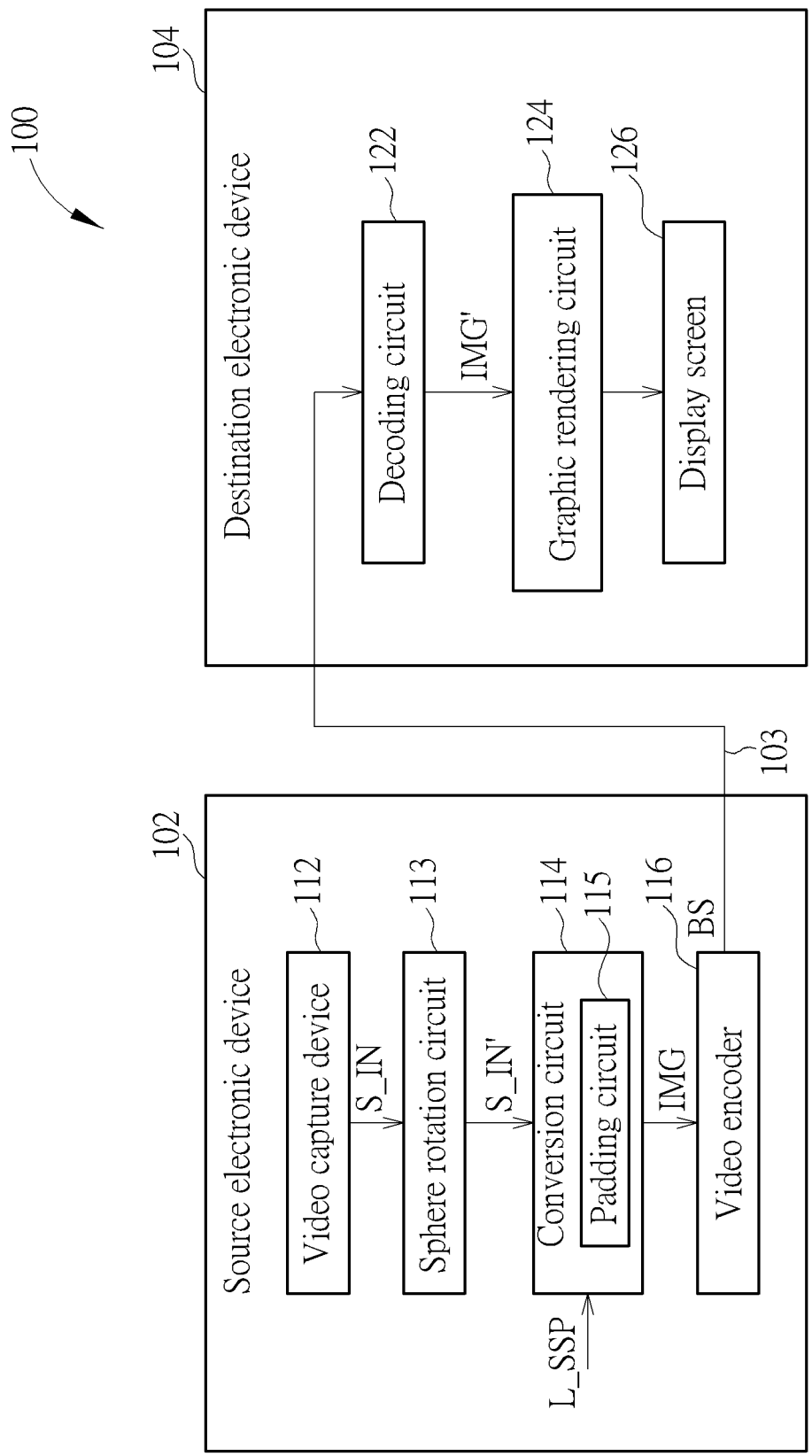
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a sphere rotation circuit 113, a conversion circuit 114, and a video encoder 116, wherein the conversion circuit 114 has a padding circuit 115. For example, the video capture device 112 may be a set of cameras used to provide an omnidirectional image/video content (e.g., multiple images that cover the whole surroundings) S_IN corresponding to a sphere. The conversion circuit 114 is coupled to the video encoder 116. The conversion circuit 114 generates a projection-based frame IMG with a segmented sphere projection (SSP) layout L_SSP according to an omnidirectional image/video content S_IN that maybe identical to the omnidirectional image/video content S_IN or may be a rotated version of the omnidirectional image/video content S_IN. The projection-based frame IMG may be one frame included in a sequence of projection-based frames generated from the conversion circuit 114. The video encoder 116 is an encoding circuit used to encode/compress the projection-based frame IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The sphere rotation circuit 113 maybe optional. In a case where the sphere rotation circuit 113 is omitted, the omnidirectional image/video content S_IN' fed into the conversion circuit 114 is same as the omnidirectional image/video content S_IN generated from the video capture device 112. In another case where the sphere rotation circuit 113 is implemented, the sphere rotation circuit 113 is used to apply content rotation to the omnidirectional image/video content S_IN. Hence, the omnidirectional image/video content S_IN' fed into the conversion circuit 114 is a rotated omnidirectional image/video content.

Figure 2:
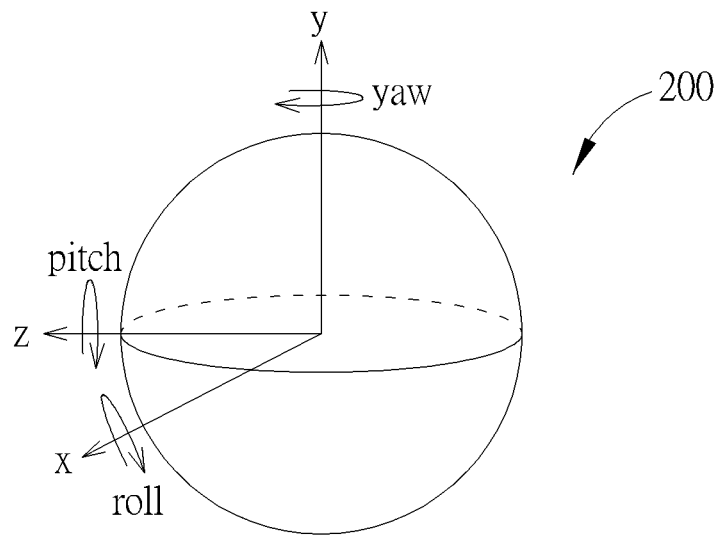
FIG. 2 is a diagram illustrating a sphere rotation performed at a sphere rotation circuit shown in FIG. 1.

FIG. 2 is a diagram illustrating a sphere rotation performed at the sphere rotation circuit 113 shown in FIG. 1. The sphere 200 maybe rotated along one or more of different rotation axes. As shown in FIG. 2, the sphere rotation of the sphere 200 may have a roll angle along an x axis, a yaw angle along a y axis, and/or a pitch angle along a z axis. For example, the rotation angle(s) may be given by a user, or may be calculated by an algorithm. In other words, the sphere rotation circuit 113 may refer to a user input to perform the sphere rotation upon the omnidirectional image/video content S_IN, or may perform the sphere rotation upon the omnidirectional image/video content S_IN without user intervention. After the sphere rotation of the sphere 200 is done, an omnidirectional image/video content of the rotated sphere 200 (i.e., omnidirectional image/video content S_IN') is projected/mapped onto projection faces via the proposed segmented sphere projection, and the projection faces packed in the proposed segmented sphere projection layout are encoded by the video encoder 116. With a proper control of the sphere rotation, contents in the projection faces can be adequately set, thereby improving the coding efficiency of the projection-based frame IMG.

The destination electronic device 104 may be a head-mounted display (HMD) device. As shown in FIG. 1, the destination electronic device 104 includes a decoding circuit 122, a graphic rendering circuit 124, and a display screen 126. The decoding circuit 122 receives the bitstream BS from the transmission means 103 (e.g., a wired/wireless communication link or a storage medium), and performs a video decoder function for decoding a part of the received bitstream BS to generate a decoded frame IMG'. For example, the decoding circuit 122 generates a sequence of decoded frames by decoding the received bitstream BS, where the decoded frame IMG' is one frame included in the sequence of decoded frames. In this embodiment, the projection-based frame IMG to be encoded by the video encoder 116 at the encoder side (i.e., source electronic device 102) has an SSP format with a selected projection layout. Hence, after the bitstream BS is decoded by the decoding circuit 122 at the decoder side (i.e., destination electronic device 104), the decoded frame IMG' has the same SSP format with the same selected projection layout. The graphic rendering circuit 124 is coupled between the decoding circuit 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

When the sphere rotation is performed at the encoder side (i.e., source electronic device 102), syntax element(s) indicative of rotation information of the sphere rotation will be signaled to the decoder side (i.e., destination electronic device 104) via the bitstream BS generated from the encoder side. In this way, the destination electronic device 104 (which has a video decoder) can know details of the encoder-side sphere rotation according to the signaled syntax element(s), and can, for example, perform a decoder-side inverse sphere rotation to obtain the needed video data for rendering and displaying.

Figure 3:
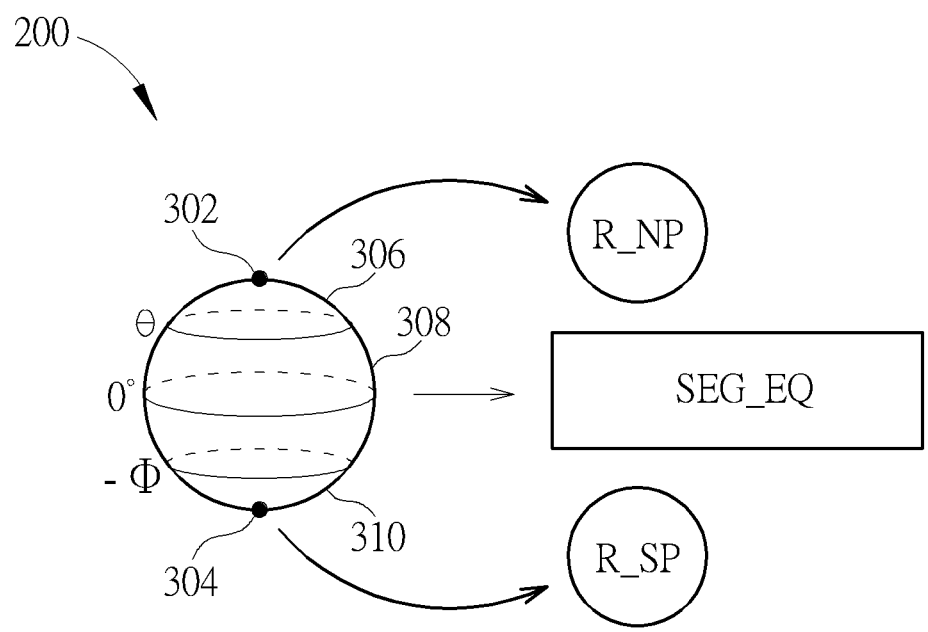
FIG. 3 is a diagram illustrating a first segmented sphere projection (SSP) format according to an embodiment of the present invention.

As mentioned above, the conversion circuit 114 generates the projection-based frame IMG according to the omnidirectional image/video content S_IN' and the SSP format layout with the selected projection layout (i.e., L_SSP). FIG. 3 is a diagram illustrating a first segmented sphere projection (SSP) format according to an embodiment of the present invention. A surface of the sphere 200 is partitioned into a north polar region 306 centered at the north pole 302, a south polar region 310 centered at the south pole 304, and a single non-polar ring-shaped segment (e.g., an equatorial segment) 308 between the north polar region 306 and the south polar region 310. A latitude of an equator of the sphere 200 is 0°. As shown in FIG. 3, the lowest latitude of the north polar region 306 is +θ, and the highest latitude of the south polar region 310 is −Φ. It should be noted that θ may be equal to or different from Φ, depending upon the actual design considerations. For example, θ=Φ=45°. In accordance with the proposed SSP format, the north polar region 306 of the sphere 200 is projected/mapped onto a first circular projection face R_NP, the south polar region 310 is projected/mapped onto a second circular projection face R_SP, and the non-polar ring-shaped segment 308 is projected/mapped onto a single rectangular projection face SEG_EQ.

In one exemplary design, the north polar region 306 is flatten into the first circular projection face R_NP via equal-angular projection, the south polar region 310 is flatten into the second circular projection face R_SP via equal-angular projection, and the non-polar ring-shaped segment 308 is mapped onto the rectangular projection face SEG_EQ via equal-area projection. However, these are for illustrative purposes only, and are not meant to be limitations of the present invention. In some embodiments of the present invention, one or both of the first circular projection face R_NP and the second circular projection face R_SP may has an equal-angular projection format or an equal-area projection format, and the rectangular projection face SEG_EQ may have an equirectangular projection format or an equal-area projection format. Moreover, non-uniform mapping may be involved in the segmented sphere projection applied to the omnidirectional image/video content S_IN' of the sphere 200.

After the first circular projection face R_NP, the second circular projection face R_SP and the rectangular projection face SEG_EQ are obtained by the conversion circuit 114, the conversion circuit 114 employs a selected SSP layout L_SSP for packing the first circular projection face R_NP, the second circular projection face R_SP and the rectangular projection face SEG_EQ. In other words, the projection-based frame IMG generated from the conversion circuit 114 has a 360-degree image/video content represented by the first circular projection face R_NP, the second circular projection face R_SP and the rectangular projection face SEG_EQ packed in the selected SSP layout L_SSP. The SSP layout L_SSP may be any arrangement of two circles (i.e., first circular projection face R_NP and second circular projection face R_SP) and one rectangle (i.e., rectangular projection face SEG_EQ).

Figure 4:
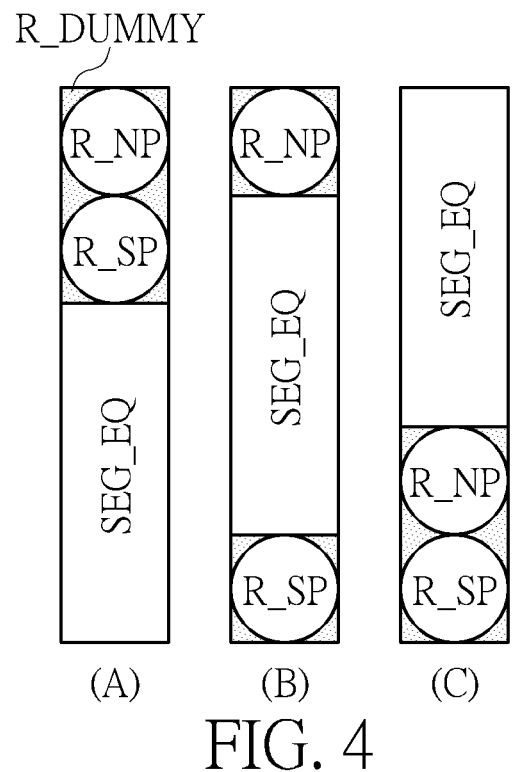
FIG. 4 is a diagram illustrating several examples of an SSP layout with centers of two circles and one rectangle that are aligned vertically in a height direction of the projection-based frame according to an embodiment of the present invention.

FIG. 4 is a diagram illustrating several examples of an SSP layout with centers of two circles and one rectangle that are aligned vertically in a height direction of the projection-based frame according to an embodiment of the present invention. The projection-based frame IMG may employ one of the exemplary SSP layouts shown in FIG. 4. Under a condition that the first circular projection face R_NP, the second circular projection face R_SP and the rectangular projection face SEG_EQ are packed in a vertical arrangement, the first circular projection face R_NP and the second circular projection face R_SP may be both located on a first side of the rectangular projection face SEG_EQ, maybe located on opposite sides of the rectangular projection face SEG_EQ, respectively, or may be both located on a second side of the rectangular projection face SEG_EQ.

Figure 5:
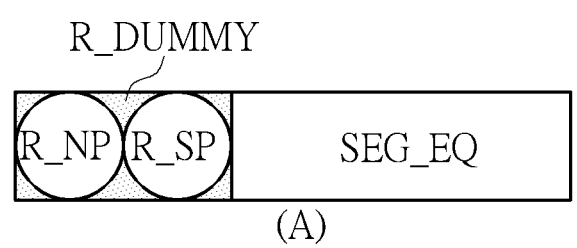
FIG. 5 is a diagram illustrating several examples of an SSP layout with centers of two circles and one rectangle that are aligned horizontally in a width direction of the projection-based frame according to an embodiment of the present invention.
Figure 5:
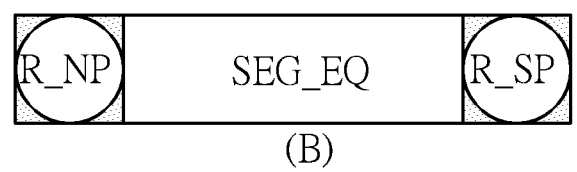
Figure 5:
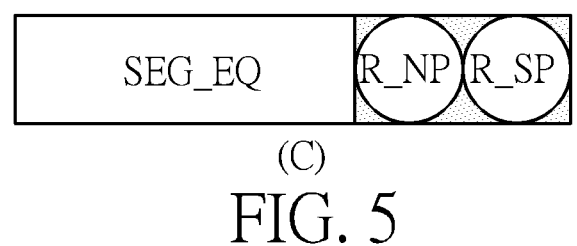

FIG. 5 is a diagram illustrating several examples of an SSP layout with centers of two circles and one rectangle that are aligned horizontally in a width direction of the projection-based frame according to an embodiment of the present invention. The projection-based frame IMG may employ one of the exemplary SSP layouts shown in FIG. 5. Under a condition that the first circular projection face R_NP, the second circular projection face R_SP and the rectangular projection face SEG_EQ are packed in a horizontal arrangement, the first circular projection face R_NP and the second circular projection face R_SP may be both located on a first side of the rectangular projection face SEG_EQ, maybe located on opposite sides of the rectangular projection face SEG_EQ, respectively, or may be both located on a second side of the rectangular projection face SEG_EQ.

Figure 6:
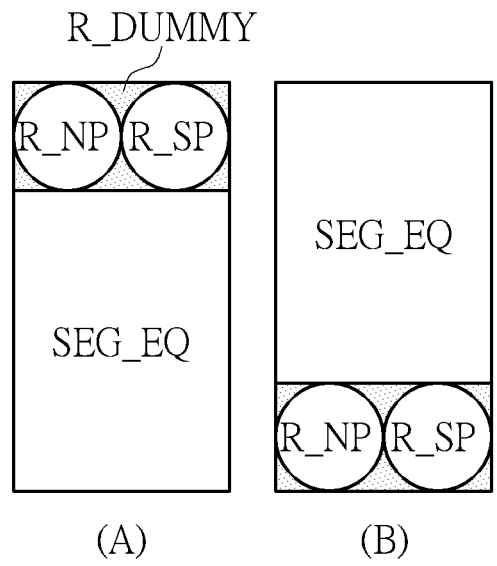
FIG. 6 is a diagram illustrating several examples of an SSP layout with two circles that have centers aligned horizontally in a width direction of the projection-based frame and are located on the same side of one rectangle according to an embodiment of the present invention.

In some embodiments of the present invention, the rectangular projection face SEG_EQ may be stretched or shrunk to have a different ratio of width and height. FIG. 6 is a diagram illustrating several examples of an SSP layout with two circles that have centers aligned horizontally in a width direction of the projection-based frame and are located on the same side of one rectangle according to an embodiment of the present invention. The rectangular projection face SEG_EQ shown in FIG. 3 maybe scaled, thus allowing the first circular projection face R_NP and the second circular projection face R_SP (which are adjacent horizontally in a width direction of the projection-based frame IMG) to be located on the same side of the scaled rectangular projection face SEG_EQ.

Figure 7:
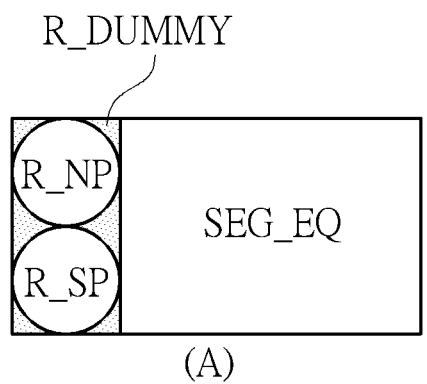
FIG. 7 is a diagram illustrating several examples of an SSP layout with two circles that have centers aligned vertically in a height direction of the projection-based frame and are located on the same side of one rectangle according to an embodiment of the present invention.
Figure 7:
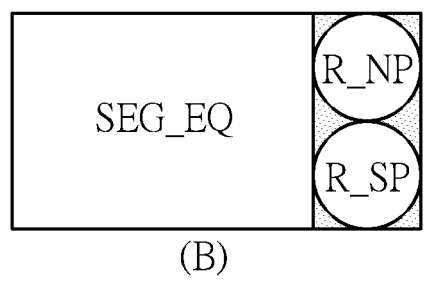

FIG. 7 is a diagram illustrating several examples of an SSP layout with two circles that have centers aligned vertically in a height direction of the projection-based frame and are located on the same side of one rectangle according to an embodiment of the present invention. The rectangular projection face SEG_EQ shown in FIG. 3 may be scaled, thus allowing the first circular projection face R_NP and the second circular projection face R_SP (which are adjacent vertically in a height direction of the projection-based frame IMG) to be located on the same side of the scaled rectangular projection face SEG_EQ.

The projection-based frame IMG to be encoded is required to be rectangular. If the SSP layout L_SSP is set by one of the exemplary SSP layouts shown in FIGS. 4-7 for creating the projection-based frame IMG, the projection-based frame IMG is required to have dummy areas R_DUMMY (e.g., black areas, gray areas, or white areas) filled in the projection-based frame IMG. For example, each dummy area R_DUMMY represented by a dotted area in FIGS. 4-7 consists of non-active pixels that are not displayable. It should be noted that locations of the first circular projection face R_NP and the second circular projection face R_SP packed in each of the exemplary SSP layouts shown in FIGS. 4-7 may be swapped, and/or the rectangular projection face SEG_EQ may be rotated/flipped. These alternative SSP layouts also fall within the scope of the present invention.

When two circles (e.g., first circular projection face R_NP and second circular projection face R_SP) are placed closely in an SSP layout, an image content discontinuity edge may exist between the adjacent circles connecting with each other at the projection face boundaries. Similarly, when one circle (e.g., first circular projection face R_NP or second circular projection face R_SP) and one rectangle (e.g., rectangular projection face SEG_EQ) are placed closely in an SSP layout, an image content discontinuity edge may exist between the adjacent circle and rectangle connecting with each other at the projection face boundaries. When dummy areas R_DUMMY (e.g., black areas, gray areas, or white areas) are filled in the projection-based frame IMG due to the fact that a shape of an arrangement of two circles and one rectangle is not a rectangle, an image content discontinuity edge may exist between a projection face and an adjacent dummy area R_DUMMY. Assume that the SSP layout L_SSP is set by one of the exemplary SSP layouts shown in FIGS. 4-7 for creating the projection-based frame IMG. Encoding of the projection-based frame IMG may introduce artifacts resulting from a discontinuous neighboring face. To address this issue, the present invention proposes introducing one guard band to a projection face in an SSP layout for reducing or eliminating artifacts caused by a discontinuous neighboring projection face.

Figure 8:
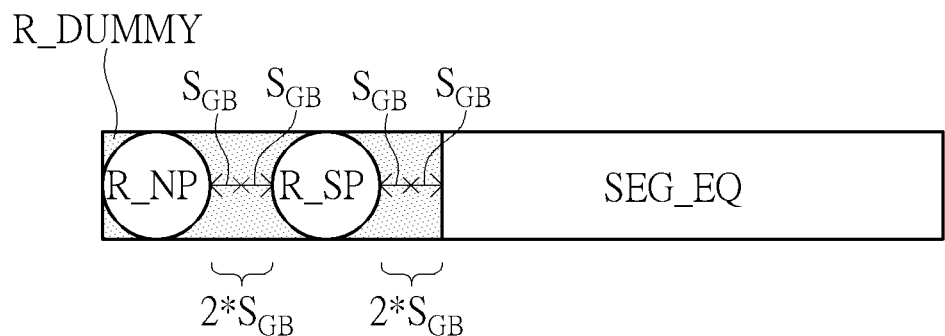
FIG. 8 is a diagram illustrating an SSP layout with guard bands according to an embodiment of the present invention.

FIG. 8 is a diagram illustrating an SSP layout with guard bands according to an embodiment of the present invention. In this embodiment, each of the projection faces has a guard band with a guard band size $S_{GB}$. For example, the guard band size $S_{GB}$ may be 8 pixels in width. It should be noted that the guard band size $S_{GB}$ may be adjustable. When the first circular projection face R_NP and the second circular projection face R_SP are packed in the SSP layout with guard bands, a space is left directly between the first circular projection face R_NP and the second circular projection face R_SP, such that the first circular projection face R_NP does not connect with the second circular projection face R_SP. As shown in FIG. 8, a width of the space between the first circular projection face R_NP and the second circular projection face R_SP (i.e., the shortest distance between boundaries of the first circular projection face R_NP and the second circular projection face R_SP) is equal to $2*S_{GB}$.

Similarly, when one circular projection face (e.g., second circular projection face R_SP) and the rectangular projection face SEG_EQ are packed in the SSP layout with guard bands, a space is left directly between the circular projection face (e.g., second circular projection face R_SP) and the rectangular projection face SEG_EQ, such that the circular projection face (e.g., second circular projection face R_SP) does not connect with the rectangular projection face SEG_EQ. As shown in FIG. 8, the width of the space between the circular projection face (e.g., second circular projection face R_SP) and the rectangular projection face SEG_EQ (i.e., the shortest distance between boundaries of the circular projection face (e.g., second circular projection face R_SP) and the rectangular projection face SEG_EQ) is equal to $2*S_{GB}$.

Since guard bands are capable of providing isolation between the first circular projection face R_NP and the second circular projection face R_SP and isolation between the second circular projection face R_SP and the rectangular projection face SEG_EQ, the artifacts caused by encoding of discontinuous projection faces can be avoided or reduced.

As mentioned above, an image content discontinuity edge may exist between circles (e.g., first circular projection face R_NP and second circular projection face R_SP) placed closely in an SSP layout, and an image content discontinuity edge may exist between one circle (e.g., first circular projection face R_NP or second circular projection face R_SP) and one rectangle (e.g., rectangular projection face SEG_EQ) placed closely in an SSP layout. When dummy areas R_DUMMY (e.g., black areas, gray areas, or white areas) are filled in the projection-based frame IMG due to the fact that a shape of an arrangement of two circles and one rectangle is not a rectangle, an image content discontinuity edge may exist between a projection face and an adjacent dummy area R_DUMMY. Encoding of the projection-based frame IMG may introduce artifacts resulting from a discontinuous neighboring face and/or non-active pixels. The present invention further proposes introducing one or more padding regions to an SSP layout for reducing or eliminating the artifacts caused by a discontinuous neighboring face and/or non-active pixels. As shown in FIG. 1, the conversion circuit 114 has the padding circuit 115 that is arranged to generate at least one padding region. Hence, the conversion circuit 114 creates the projection-based frame IMG by packing projection faces R_NP, R_SP and SEG_EQ obtained by the proposed segmented sphere projection and at least one padding region obtained by the proposed padding technique in the SSP layout L_SSP.

Figure 9:
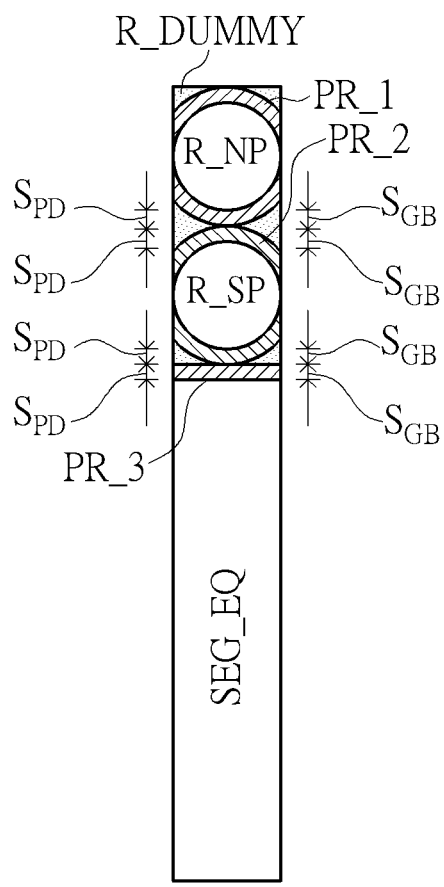
FIG. 9 is a diagram illustrating an SSP layout with padding according to an embodiment of the present invention.

FIG. 9 is a diagram illustrating an SSP layout with padding according to an embodiment of the present invention. In this embodiment, each of the projection faces has a padding region with a padding size $S_{PD}$. For example, the padding size $S_{PD}$ may be 8 pixels in height. It should be noted that the padding size $S_{PD}$ may be adjustable. As shown in FIG. 9, a first padding region PR_1 connects with the boundary of the first circular projection face R_NP, a second padding region PR_2 connects with the boundary of the second circular projection face R_SP, and a third padding region PR_3 connects with one side/boundary of the rectangular projection face SEG_EQ. Each of the first padding region PR_1 and the second padding region PR_2 has the shape of a ring, and has a specified padding radius set by the padding size $S_{PD}$. The third padding region PR_3 has the shape of a rectangle, and has a specified padding height set by the padding size $S_{PD}$. In this embodiment, the padding size $S_{PD}$ may be equal to the guard band size $S_{GB}$. However, this is for illustrative purposes only, and is not meant to be a limitation of the present invention.

In the first exemplary padding implementation, the padding circuit 115 applies geometry padding to a projection face to determine pixel values of pixels included in a padding region of the projection face. For example, the geometry padding applied to the first circular projection face R_NP determines a geometry mapping result of the first padding region PR_1 for setting pixel values of pixels included in the first padding region PR_1. The geometry mapping result is obtained from mapping the content of a region on a sphere (e.g., sphere 200 shown in FIG. 3) onto the first padding region PR_1, wherein the region on the sphere is adjacent to a region from which the first circular projection face R_NP is obtained. Hence, there is an image content continuity edge between the first circular projection face R_NP and the geometry mapping result of the first padding region PR_1.

For another example, the geometry padding applied to the second circular projection face R_SP determines a geometry mapping result of the second padding region PR_2 for setting pixel values of pixels included in the second padding region PR_2. The geometry mapping result is obtained from mapping the content of a region on a sphere (e.g., sphere 200 shown in FIG. 3) onto the second padding region PR_2, wherein the region on the sphere is adjacent to a region from which the second circular projection face R_NP is obtained. Hence, there is an image content continuity edge between the second circular projection face R_SP and the geometry mapping result of the second padding region PR_2.

For yet another example, the geometry padding applied to the rectangular projection face SEG_EQ determines a geometry mapping result of the third padding region PR_3 for setting pixel values of pixels included in the third padding region PR_3. The geometry mapping result is obtained from mapping the content of a region on a sphere (e.g., sphere 200 shown in FIG. 3) onto the third padding region PR_3, wherein the region on the sphere is adjacent to a region from which the rectangular projection face SEG_EQ is obtained. Hence, there is an image content continuity edge between the rectangular projection face SEG_EQ and the geometry mapping result of the third padding region PR_3.

In the second exemplary padding implementation, the padding circuit 115 derives pixel values of pixels included in a padding region from duplication of pixel values of pixels included in a projection face. For example, boundary pixels of the projection face are duplicated to create padding pixels of the projection face. That is, a padding region of a projection face is creating by spreading boundary pixels of the projection face outwards.

Concerning the first padding region PR_1 with the shape of a ring, pixel values of some pixels included in the first padding region PR_1 may be directly set by duplicating pixel values of boundary pixels of the first circular projection face R_NP, and pixel values of some pixels included in the first padding region PR_1 may be derived from interpolation of duplicated pixel values, each being set by duplicating a value of a boundary pixel of the first circular projection face R_NP.

Concerning the second padding region PR_2 with the shape of a ring, pixel values of some pixels included in the second padding region PR_2 may be directly set by duplicating pixel values of boundary pixels of the second circular projection face R_SP, and pixel values of some pixels included in the second padding region PR_2 may be derived from interpolation of duplicated pixel values, each being set by duplicating a value of a boundary pixel of the second circular projection face R_SP.

Concerning the third padding region PR_3 with the shape of a rectangle, pixel values of all pixels included in the third padding region PR_3 may be directly set by duplicating pixel values of boundary pixels of the rectangular projection face SEG_EQ.

In the third padding implementation, the padding circuit 115 sets pixel values of pixels included in a padding region by interpolation that is based on pixel values of pixels included in a projection face and an adjacent dummy area. Regarding the first circular projection face R_NP, pixel values of pixels included in the first padding region PR_1 are acquired by interpolation that is based on pixel values of pixels included in the first circular projection face R_NP and the adjacent dummy area R_DUMMY. Regarding the second circular projection face R_SP, pixel values of pixels included in the second padding region PR_2 are acquired by interpolation that is based on pixel values of pixels included in the second circular projection face R_SP and the adjacent dummy area R_DUMMY. The employed interpolation may be nearest neighbor interpolation, linear interpolation, bilinear interpolation, or other interpolation algorithm. Further, the sample points used by the employed interpolation may be obtained from a single direction or different directions.

Figure 10:
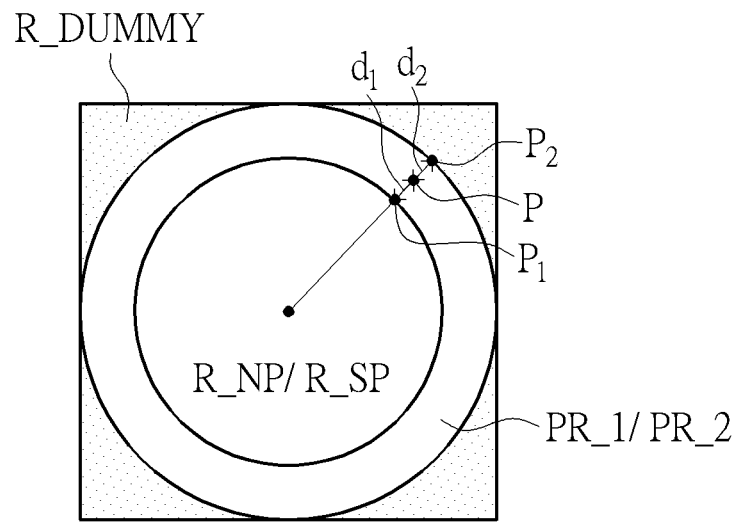
FIG. 10 is a diagram illustrating a first example of interpolation performed by a padding circuit shown in FIG. 1.

FIG. 10 is a diagram illustrating a first example of interpolation performed by the padding circuit 115 shown in FIG. 1. A padding region (e.g., PR_1 or PR_2) is required to be created and connected with a projection face (e.g., R_NP or R_SP) for isolating the projection face from a dummy area (e.g., R_DUMMY). As shown in FIG. 10, interpolation is performed upon sample points (i.e., pixels) P1 and P2 obtained from the projection face and the dummy area. For example, the sample point P1 is a boundary pixel of the projection face, and the sample point P2 is a non-active pixel of the dummy area. Hence, an interpolated sample point (i.e., a padding pixel) P is determined according to sample values of the sample points P1 and P2, a distance d1 between the sample point P1 and the interpolated sample point P, and a distance d2 between the sample point P2 and the interpolated sample point P. By way of example, but not limitation, the sample value of the interpolated sample point P (which is one of the padding pixels in the padding region PR_1/PR_2) may be computed on the basis of a distance-based weighting function. The interpolation may be expressed using the following equation.

$$P = \frac{d1 \cdot P2 + d2 \cdot P1}{d1 + d2} \quad (1)$$

Regarding the rectangular projection face SEG_EQ, pixel values of pixels included in the third padding region PR_3 are acquired by interpolation that is based on pixel values of pixels included in the rectangular projection face SEG_EQ and the adjacent dummy area R_DUMMY. The employed interpolation may be nearest neighbor interpolation, linear interpolation, bilinear interpolation, or other interpolation algorithm. Further, the sample points used by the employed interpolation may be obtained from a single direction or different directions.

Figure 11:
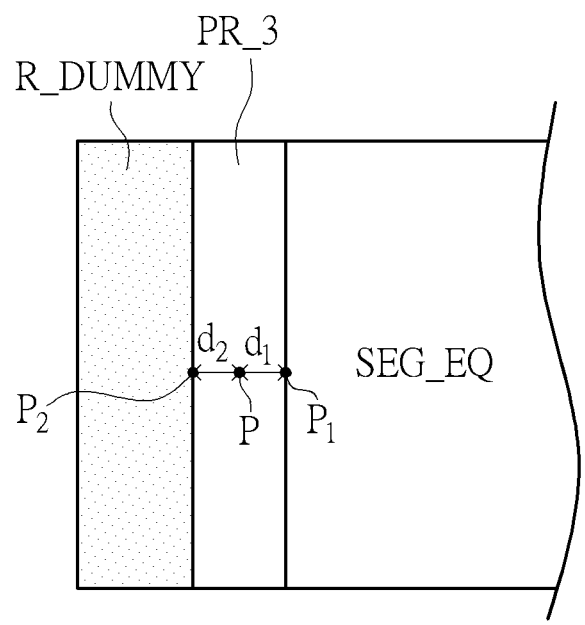
FIG. 11 is a diagram illustrating a second example of interpolation performed by the padding circuit shown in FIG. 1.

FIG. 11 is a diagram illustrating a second example of interpolation performed by the padding circuit 115 shown in FIG. 1. A padding region (e.g., PR_3) is required to be created and connected with a projection face (e.g., SEG_EQ) for isolating the projection face from a dummy area (e.g., R_DUMMY). As shown in FIG. 11, interpolation is performed upon sample points (i.e., pixels) P1 and P2 obtained from the projection face and the dummy area. For example, the sample point P1 is a boundary pixel of the projection face, and the sample point P2 is a non-active pixel of the dummy area. Hence, an interpolated sample point (i.e., a padding pixel) P is determined according to sample values of the sample points P1 and P2, a distance d1 between the sample point P1 and the interpolated sample point P, and a distance d2 between the sample point P2 and the interpolated sample point P. By way of example, but not limitation, the above equation (1) may be used for computing the sample value of the interpolated sample point P (which is one of the padding pixels in the padding region PR_3).

In the fourth padding implementation, the padding circuit 115 sets pixel values of pixels included in a padding region by duplication that is applied to pixel values of pixels that are included in an adjacent projection face but do not connect with the padding region. For example, the padding region is a duplicate of a partial region of the adjacent projection face, where the partial region of the adjacent projection face does not connect with the padding region.

Figure 12:
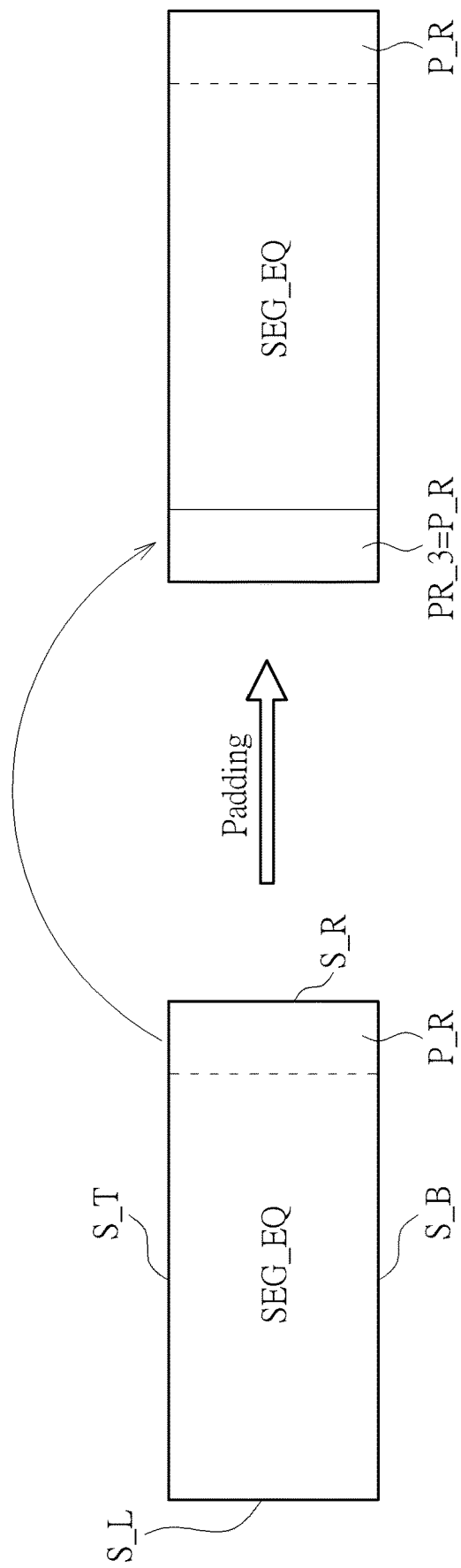
FIG. 12 is a diagram illustrating an example of duplication performed by the padding circuit shown in FIG. 1 for generating a padding region of a rectangular projection face.

FIG. 12 is a diagram illustrating an example of duplication performed by the padding circuit 115 shown in FIG. 1 for generating a padding region of a rectangular projection face. The rectangular projection face SEG_EQ with a top side S_T, a bottom side S_B, a left side S_L and a right side S_R may be arranged in an equirectangular projection (ERP) format or an equal-area projection (EAP) format. In addition, the rectangular projection face SEG_EQ has a partial region P_R which includes boundary pixels at the right side S_R. The third padding region PR_3 is required to be added to the left side S_L of the rectangular projection face SEG_EQ.

In this embodiment, the third padding region PR_3 is a duplicate of the partial region P R of the rectangular projection face SEG_EQ. Hence, pixels of the third padding region PR_3 include boundary pixels at the right side S_R of the projection face A, but do not include boundary pixels at the left side S_L of the projection face A. Since left side S_L and right side S_R of the rectangular projection face SEG_EQ are opposite sides, the third padding region PR_3 that has boundary pixels at the right side S_R of the projection face A does not connect with the right side S_R of the rectangular projection face SEG_EQ. Due to inherent characteristics of the equirectangular projection/equal-area projection, there is an image content continuity boundary between the third padding region PR_3 and the rectangular projection face SEG_EQ packed in the SSP layout with padding (i.e., content is continuously represented in the rectangular projection face SEG_EQ and the third padding region PR_3).

With regard to the rectangular projection face SEG_EQ, padding can be applied on the boundary. In above examples shown in FIG. 11 and FIG. 12, one padding region is generated and connected with the left side of the rectangular projection face SEG_EQ. However, this is for illustrative purposes only, and is not meant to be a limitation of the present invention. For example, a single padding region may be generated and connected with any side of the rectangular projection face SEG_EQ. For another example, multiple padding regions may be generated and connected with multiple sides (or all sides) of the rectangular projection face SEG_EQ, respectively. These alternative padding designs all fall within the scope of the present invention.

Figure 13:
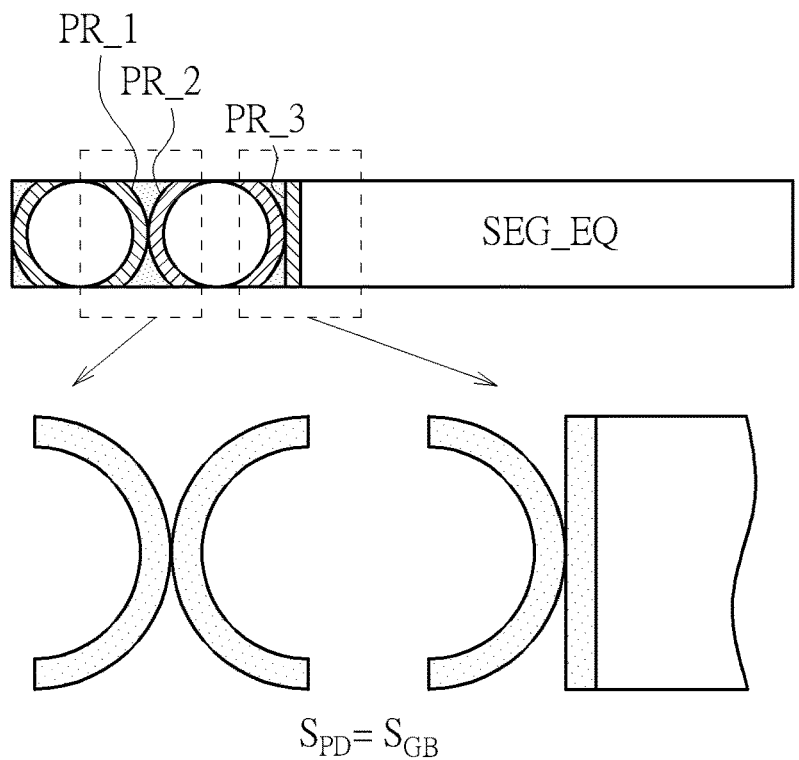
FIG. 13 is a diagram illustrating a first SSP layout with padding and guard bands according to an embodiment of the present invention.

As mentioned above, one guard band is introduced to a projection face in an SSP layout for reducing or eliminating artifacts caused by a discontinuous neighboring projection face. Consider a case where padding is applied on the guard band left between two projection faces. When the padding size $S_{PD}$ is not larger than the guard band size $S_{GB}$ (i.e., $S_{PD} \leq S_{GB}$), padding regions of adjacent projection faces are placed in the SSP layout without overlapping. FIG. 13 is a diagram illustrating a first SSP layout with padding and guard bands according to an embodiment of the present invention. In this example, the padding size $S_{PD}$ is equal to the guard band size $S_{GB}$ (i.e., $S_{PD}=S_{GB}$). Hence, the first padding region PR_1 and the second padding region PR_2 are placed closely to have boundary padding pixels connected with each other, and the second padding region PR_2 and the third padding region PR_3 are placed closely to have boundary padding pixels connected with each other.

Figure 14:
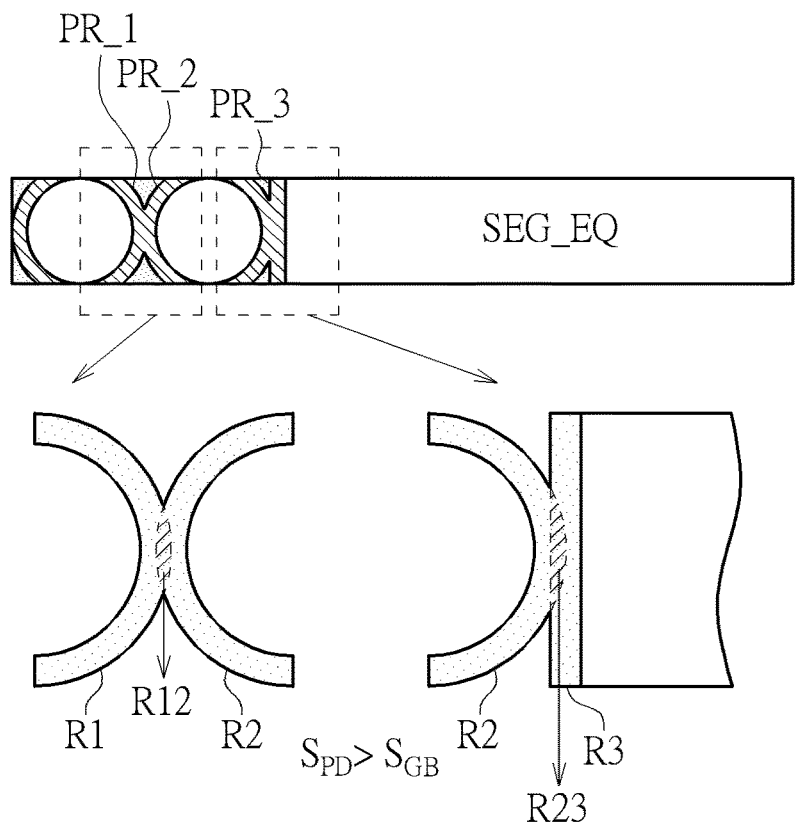
FIG. 14 is a diagram illustrating a second SSP layout with padding and guard bands according to an embodiment of the present invention.

However, when the padding size $S_{PD}$ is larger than the guard band size $S_{GB}$ (i.e., $S_{PD}>S_{GB}$), padding regions of adjacent projection faces are placed in the SSP layout with overlapping. FIG. 14 is a diagram illustrating a second SSP layout with padding and guard bands according to an embodiment of the present invention. Since the padding size $S_{PD}$ is larger than the guard band size $S_{GB}$ (i.e., $S_{PD}>S_{GB}$), the space left between adjacent projection faces is unable to make padding regions generated for the adjacent projection faces separated from each other. As shown in FIG. 14, an overlapping region R12 exists between the first padding region PR_1 and the second padding region PR_2, inevitably; and an overlapping region R23 exists between the second padding region PR_2 and the third padding region PR_3, inevitably. Specifically, after the first padding region PR_1, the second padding region PR_2 and the third padding region PR_3 are packed in the SSP layout with padding, the first padding region PR_1 may be regarded as having a non-overlapping region R1 and the overlapping region R12, the second padding region PR_2 may be regarded as having a non-overlapping region R2 and two overlapping regions R12 and R23, and the third padding region PR_3 may be regarded as having a non-overlapping region R3 and the overlapping region R23.

Since the overlapping region R12 may be regarded as a part of the first padding region PR_1 and may also be regarded as a part of the second padding region PR_2, the conversion circuit 114 (particularly, padding circuit 115 in the conversion circuit 114) should properly deal with pixel values of overlapping pixels included in the overlapping region R12. Similarly, since the overlapping region R23 may be regarded as a part of the second padding region PR_2 and may also be regarded as a part of the third padding region PR_3, the conversion circuit 114 (particularly, padding circuit 115 in the conversion circuit 114) should properly deal with pixel values of overlapping pixels included in the overlapping region R23.

In a first exemplary overlapping design, a pixel value of an overlapping pixel included in an overlapping region resulting from packing of two adjacent padding regions is directly set by a pixel value of a padding pixel originally included in a padding region selected from the two padding regions.

Figure 15:
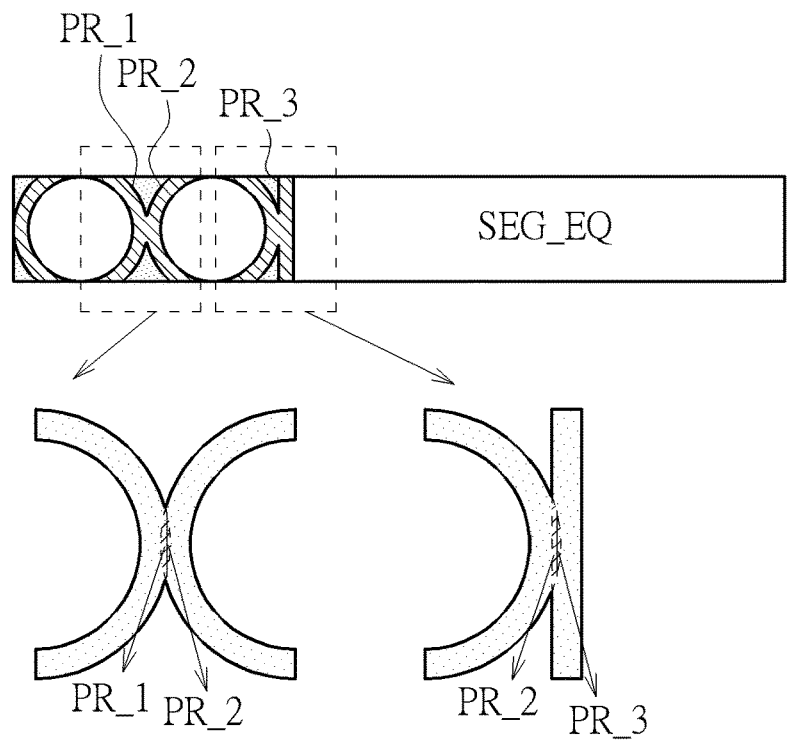
FIG. 15 is a diagram illustrating a first example of setting pixel values of overlapping pixels included in an overlapping region according to an embodiment of the present invention.

Please refer to FIG. 15 in conjunction with FIG. 14. FIG. 15 is a diagram illustrating a first example of setting pixel values of overlapping pixels included in an overlapping region according to an embodiment of the present invention. When an overlapping pixel included in the overlapping region R12 is nearer to the non-overlapping region R1 of the first padding region PR_1 than the non-overlapping region R2 of the second padding region PR_2, the pixel value of the overlapping pixel included in the overlapping region R12 is directly set by a pixel value of a co-located padding pixel included in the first padding region PR_1; and when the overlapping pixel included in the overlapping region R12 is nearer to the non-overlapping region R2 of the second padding region PR_2 than the non-overlapping region R1 of the first padding region PR_1, the pixel value of the overlapping pixel included in the overlapping region R12 is directly set by a pixel value of a co-located padding pixel included in the second padding region PR_2. As shown in FIG. 15, a left part of the overlapping region R12 is set by padding pixels included in the first padding region PR_1, and a right part of the overlapping region R12 is set by padding pixels included in the second padding region PR_2. In other words, when the first padding region PR_1 fully generated for the first circular projection face R_NP and the second padding region PR_2 fully generated for the second circular projection face R_SP are packed in the SSP layout with padding and guard bands, a portion of padding pixels of the second padding region PR_2 that are located in the left part of the overlapping region R12 may be discarded, and a portion of padding pixels of the first padding region PR_1 that are located in the right part of the overlapping region R12 may be discarded.

When an overlapping pixel included in the overlapping region R23 is nearer to the non-overlapping region R2 of the second padding region PR_2 than the non-overlapping region R3 of the third padding region PR_3, the pixel value of the overlapping pixel included in the overlapping region R23 is directly set by a pixel value of a co-located padding pixel included in the second padding region PR_2; and when the overlapping pixel included in the overlapping region R23 is nearer to the non-overlapping region R3 of the third padding region PR_3 than the non-overlapping region R2 of the second padding region PR_2, the pixel value of the overlapping pixel included in the overlapping region R23 is directly set by a pixel value of a co-located padding pixel included in the third padding region PR_3. As shown in FIG. 15, a left part of the overlapping region R23 is set by padding pixels included in the second padding region PR_2, and a right part of the overlapping region R23 is set by padding pixels included in the third padding region PR_3. In other words, when the second padding region PR_2 fully generated for the second circular projection face R_SP and the third padding region PR_3 fully generated for the rectangular projection face SEG_EQ are packed in the SSP layout with padding and guard bands, a portion of padding pixels of the third padding region PR_3 that are located in the left part of the overlapping region R23 may be discarded, and a portion of padding pixels of the second padding region PR_2 that are located in the right part of the overlapping region R23 may be discarded.

In a second exemplary overlapping design, a pixel value of an overlapping pixel included in an overlapping region resulting from packing of two adjacent padding regions is set by blending pixel values of co-located padding pixels belonging to the two padding regions, respectively.

Figure 16:
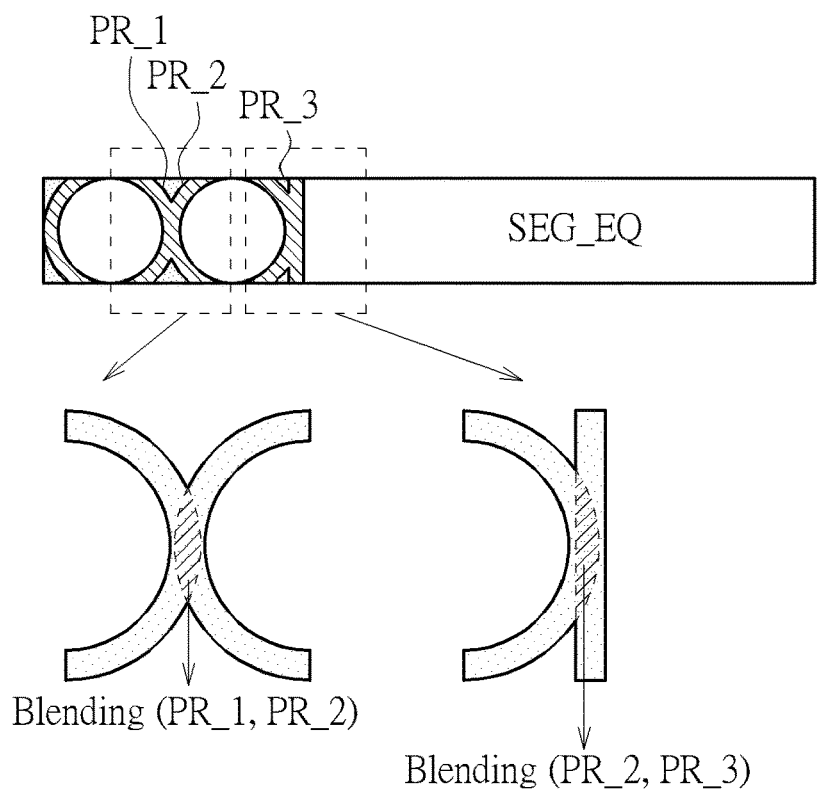
FIG. 16 is a diagram illustrating a second example of setting pixel values of overlapping pixels included in an overlapping region according to an embodiment of the present invention.

Please refer to FIG. 16 in conjunction with FIG. 14. FIG. 16 is a diagram illustrating a second example of setting pixel values of overlapping pixels included in an overlapping region according to an embodiment of the present invention. When the first padding region PR_1 fully generated for the first circular projection face R_NP and the second padding region PR_2 fully generated for the second circular projection face R_SP are packed in the SSP layout with padding and guard bands, a pixel value of an overlapping pixel included in the overlapping region R12 is set by blending (e.g., averaging) a pixel value of a co-located padding pixel in the first padding region PR_1 and a pixel value of a co-located padding pixel in the second padding region PR_2. In addition, when the second padding region PR_2 fully generated for the second circular projection face R_SP and the third padding region PR_3 fully generated for the rectangular projection face SEG_EQ are packed in the SSP layout with padding and guard bands, a pixel value of an overlapping pixel included in the overlapping region R23 is set by blending (e.g., averaging) a pixel value of a co-located padding pixel available in the second padding region PR_2 and a pixel value of a co-located padding pixel available in the third padding region PR_3. That is, a pixel value of each overlapping pixel included in the overlapping region R12 may be set by an average of a pixel value of a co-located padding pixel obtained from the first padding region PR_1 and a pixel value of a co-located padding pixel obtained from the second padding region PR_2, and a pixel value of each overlapping pixel included in the overlapping region R23 may be set by an average of a pixel value of a co-located padding pixel obtained from the second padding region PR_2 and a pixel value of a co-located padding pixel obtained from the third padding region PR_3.

In a third exemplary overlapping design, pixel values of all overlapping pixels included in an overlapping region resulting from packing of two adjacent padding regions are directly set by pixel values of co-located padding pixels included in the same padding region, respectively.

Figure 17:
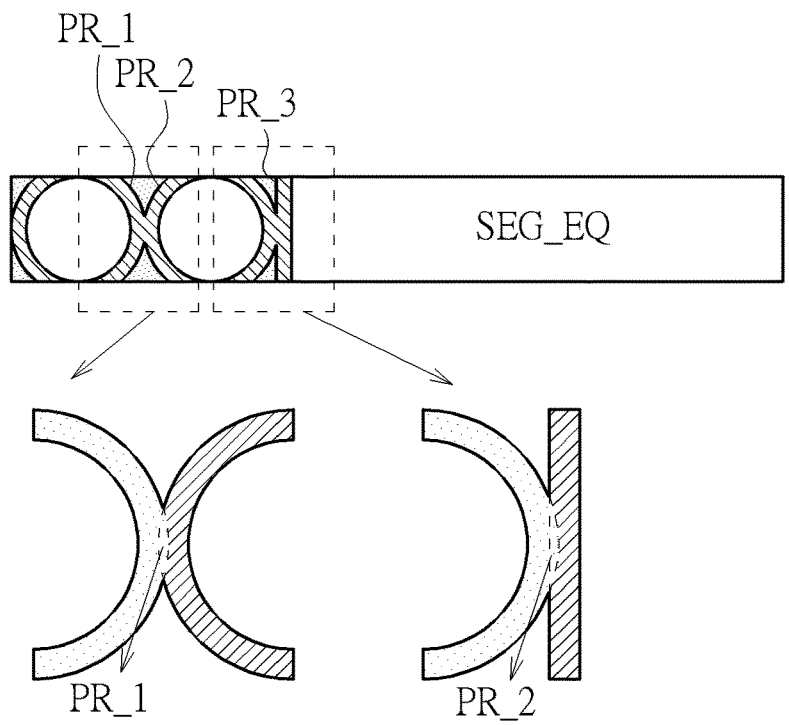
FIG. 17 is a diagram illustrating a third example of setting pixel values of overlapping pixels included in an overlapping region according to an embodiment of the present invention.

Please refer to FIG. 17 in conjunction with FIG. 14. FIG. 17 is a diagram illustrating a third example of setting pixel values of overlapping pixels included in an overlapping region according to an embodiment of the present invention. In this example, pixel values of all overlapping pixels included in the overlapping region R12 are directly set by pixel values of co-located padding pixels in the first padding region PR_1 only, and pixel values of all overlapping pixels included in the overlapping region R23 are directly set by pixel values of co-located padding pixels in the second padding region PR_2 only. In other words, when the first padding region PR_1 fully generated for the first circular projection face R_NP and the second padding region PR_2 fully generated for the second circular projection face R_SP are packed in the SSP layout with padding and guard bands, a portion of padding pixels of the second padding region PR_2 that are located in the overlapping region R12 (i.e., co-located padding pixels in the second padding region PR_2) may be discarded; and when the second padding region PR_2 fully generated for the second circular projection face R_SP and the third padding region PR_3 fully generated for the rectangular projection face SEG_EQ are packed in the SSP layout with padding and guard bands, a portion of padding pixels of the third padding region PR_3 that are located in the overlapping region R23 (i.e., co-located padding pixels in the third padding region PR_3) may be discarded.

Figure 18:
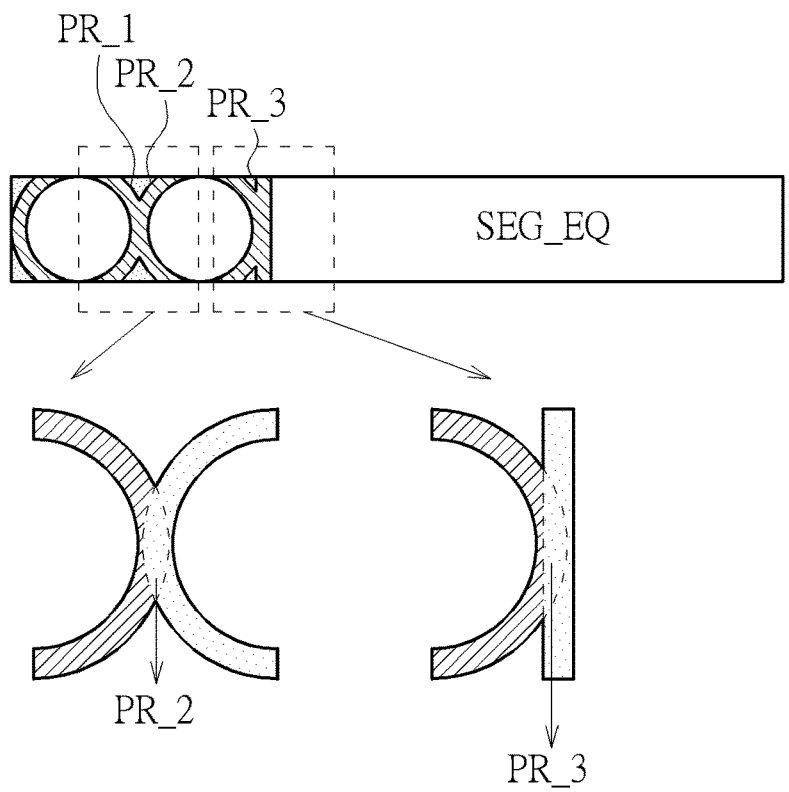
FIG. 18 is a diagram illustrating a fourth example of setting pixel values of overlapping pixels included in an overlapping region according to an embodiment of the present invention.

Please refer to FIG. 18 in conjunction with FIG. 14. FIG. 18 is a diagram illustrating a fourth example of setting pixel values of overlapping pixels included in an overlapping region according to an embodiment of the present invention. In this example, pixel values of all overlapping pixels included in the overlapping region R12 are directly set by pixel values of co-located padding pixels in the second padding region PR_2 only, and pixel values of all overlapping pixels included in the overlapping region R23 are directly set by pixel values of co-located padding pixels in the third padding region PR_3 only. In other words, when the first padding region PR_1 fully generated for the first circular projection face R_NP and the second padding region PR_2 fully generated for the second circular projection face R_SP are packed in the SSP layout with padding and guard bands, a portion of padding pixels of the first padding region PR_1 that are located in the overlapping region R12 (i.e., co-located padding pixels in the first padding region PR_1) may be discarded, and when the second padding region PR_2 fully generated for the second circular projection face R_SP and the third padding region PR_3 fully generated for the rectangular projection face SEG_EQ are packed in the SSP layout with padding and guard bands, a portion of padding pixels of the second padding region PR_2 that are located in the overlapping region R23 (i.e., co-located padding pixels in the second padding region PR_2) may be discarded.

In a fourth exemplary overlapping design, a pixel value of an overlapping pixel included in an overlapping region resulting from packing of two adjacent padding regions is set by blending pixel values of different pixels, where one of the different pixels may be a boundary pixel selected from one of a first projection face and a padding region (which is inserted between the first projection face and a second projection face), and the other of the different pixels may be a boundary pixel selected from one of the second projection face and the padding region.

Figure 19:
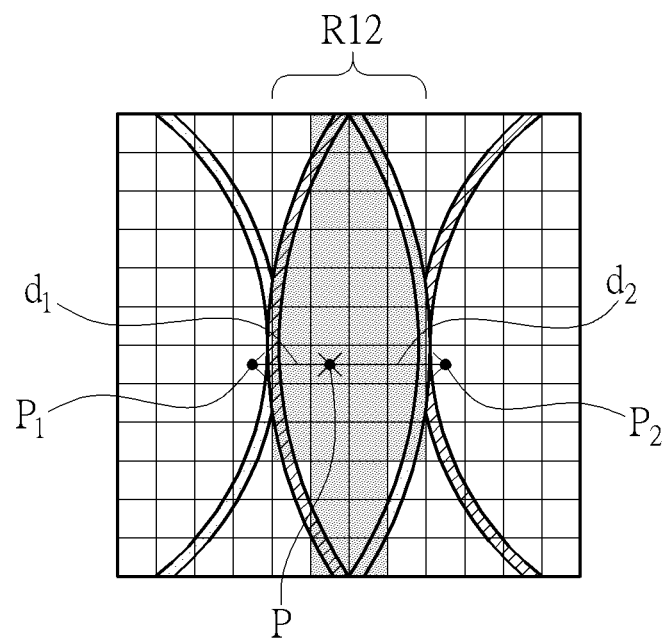
FIG. 19 is a diagram illustrating a fifth example of setting pixel values of overlapping pixels included in an overlapping region according to an embodiment of the present invention.

Please refer to FIG. 19 in conjunction with FIG. 14. FIG. 19 is a diagram illustrating a fifth example of setting pixel values of overlapping pixels included in an overlapping region according to an embodiment of the present invention. In this example, the padding circuit 115 sets pixel values of overlapping pixels included in the overlapping region R12 by interpolation that is based on a pixel value of a pixel included in the first circular projection face R_NP and a pixel value of a pixel included in the second circular projection face R_SP. The employed interpolation may be nearest neighbor interpolation, linear interpolation, bilinear interpolation, or other interpolation algorithm. Further, the sample points used by the employed interpolation may be obtained from a single direction or different directions.

As shown in FIG. 19, horizontal interpolation is performed upon sample points (i.e., pixels) P1 and P2 obtained from the first circular projection face R_NP and the second circular projection face R_SP. For example, the sample point P1 is a boundary pixel of the first circular projection face R_NP, and the sample point P2 is a boundary pixel of the second circular projection face R_SP. Hence, an interpolated sample point (i.e., an overlapping pixel) P in the overlapping region R12 is determined according to sample values of the sample points P1 and P2, a distance d1 between the sample point P1 and the interpolated sample point P, and a distance d2 between the sample point P2 and the interpolated sample point P. By way of example, the sample value of the interpolated sample point P (which is one of the overlapping pixels in the overlapping region R12) may be computed by using the above equation (1).

Figure 20:
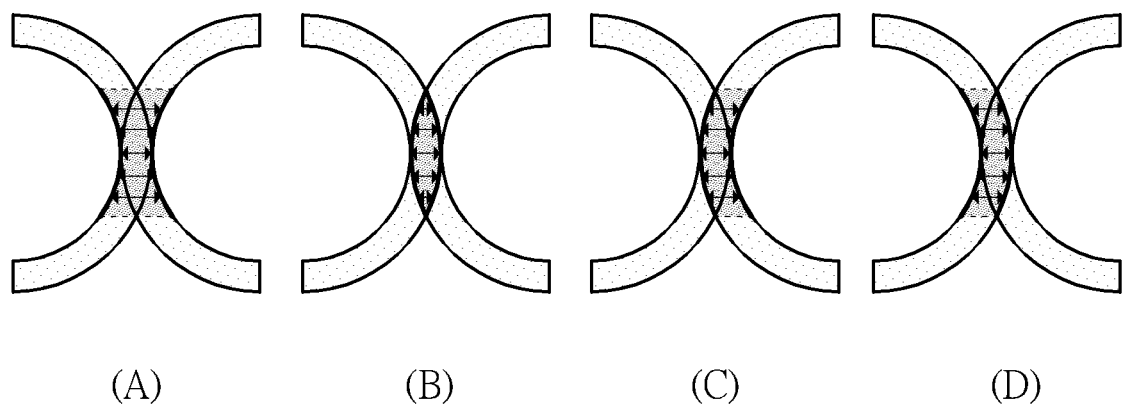
FIG. 20 is a diagram illustrating different selections of sample points involved in calculating a pixel value of an interpolated sample point (i.e., an overlapping pixel) in an overlapping region of two circular projection faces according to an embodiment of the present invention.

The interpolation shown in FIG. 19 is for illustrative purposes only, and is not meant to be a limitation of the present invention. In some embodiments of the present invention, the interpolation region can start/end at different positions. Hence, a sample point used by the interpolation can be a boundary pixel of a circular projection face R_NP/R_SP, a boundary pixel of a padding region PR_1/PR_2, or any point in the padding region PR_1/PR_2. FIG. 20 is a diagram illustrating different selections of sample points involved in interpolation computation used to calculate a pixel value of an interpolated sample point (i.e., an overlapping pixel) in the overlapping region R12 according to an embodiment of the present invention. As shown in the sub-diagram (A) of FIG. 20, each horizontal interpolation is performed upon one sample point being a boundary pixel of the first circular projection face R_NP and the other sample point being a boundary pixel of the second circular projection face R_SP. As shown in the sub-diagram (B) of FIG. 20, each horizontal interpolation is performed upon one sample point being a pixel of the padding region PR_2 which is located on the boundary of the first padding region PR_1 and the other sample point being a pixel of the padding region PR_1 which is located on the boundary of the second padding region PR_2. As shown in the sub-diagram (C) of FIG. 20, each horizontal interpolation is performed upon one sample point being a pixel of the first padding region PR_1 which is located on the boundary of the second padding region PR_2 and the other sample point being a boundary pixel of the second circular projection face R_SP. As shown in the sub-diagram (D) of FIG. 20, each horizontal interpolation is performed upon one sample point being a boundary pixel of the first circular projection face R_NP and the other sample point being a pixel of the second padding region PR_2 which is located on the boundary of the first padding region PR_1.

Figure 21:
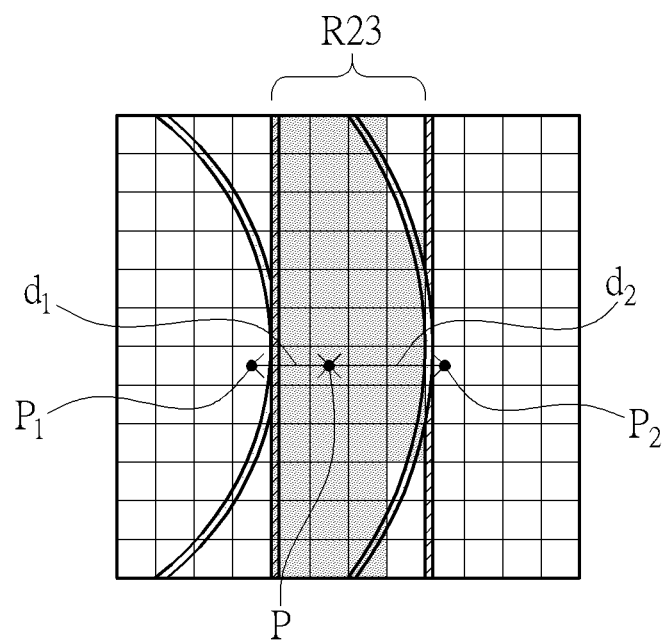
FIG. 21 is a diagram illustrating a sixth example of setting pixel values of overlapping pixels included in an overlapping region according to an embodiment of the present invention.

Please refer to FIG. 21 in conjunction with FIG. 14. FIG. 21 is a diagram illustrating a sixth example of setting pixel values of overlapping pixels included in an overlapping region according to an embodiment of the present invention. In this example, the padding circuit 115 sets pixel values of overlapping pixels included in the overlapping region R23 by interpolation that is based on a pixel value of a pixel included in the second circular projection face R_SP and a pixel value of a pixel included in the rectangular projection face SEG_EQ. The employed interpolation may be nearest neighbor interpolation, linear interpolation, bilinear interpolation, or other interpolation algorithm. Further, the sample points used by the employed interpolation may be obtained from a single direction or different directions.

As shown in FIG. 21, horizontal interpolation is performed upon sample points (i.e., pixels) P1 and P2 obtained from the second circular projection face R_SP and the rectangular projection face SEG_EQ. For example, the sample point P1 is a boundary pixel of the second circular projection face R_SP, and the sample point P2 is a boundary pixel of the rectangular projection face SEG_EQ. Hence, an interpolated sample point (i.e., an overlapping pixel) P in the overlapping region R23 is determined according to sample values of the sample points P1 and P2, a distance d1 between the sample point P1 and the interpolated sample point P, and a distance d2 between the sample point P2 and the interpolated sample point P. By way of example, the sample value of the interpolated sample point P (which is one of the overlapping pixels in the overlapping region R23) may be computed by using the above equation (1).

Figure 22:
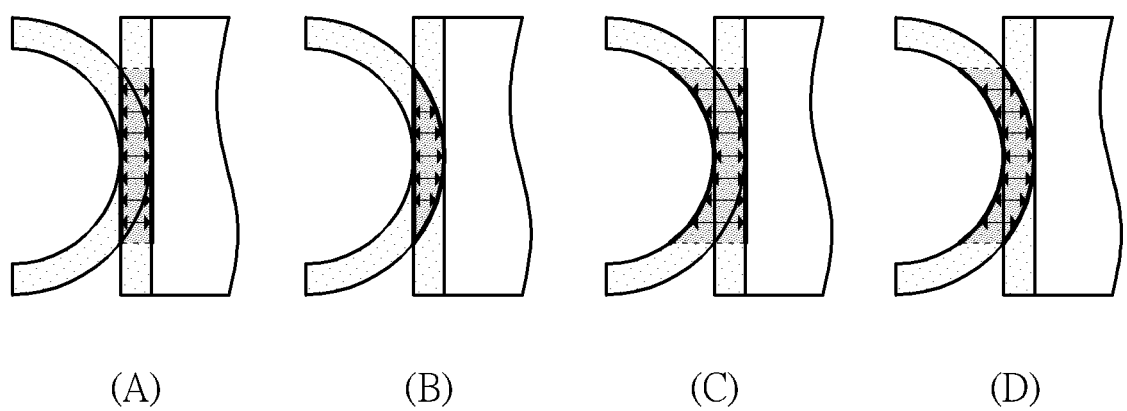
FIG. 22 is a diagram illustrating different selections of sample points involved in calculating a pixel value of an interpolated sample point (i.e., an overlapping pixel) in an overlapping region of one circular projection face and one rectangular projection face according to an embodiment of the present invention.

The interpolation shown in FIG. 21 is for illustrative purposes only, and is not meant to be a limitation of the present invention. In some embodiments of the present invention, the interpolation region can start/end at different positions. Hence, a sample point used by the interpolation can be a boundary pixel of a projection face R_SP/SEG_EQ, a boundary pixel of a padding region PR_2/PR_3, or any point in the padding region PR_2/PR_3. FIG. 22 is a diagram illustrating different selections of sample points involved in interpolation computation used to calculate a pixel value of an interpolated sample point (i.e., an overlapping pixel) in the overlapping region R23 according to an embodiment of the present invention. As shown in the sub-diagram (A) of FIG. 22, each horizontal interpolation is performed upon one sample point being a pixel of the second padding region PR_2 which is located on the boundary of the third padding region PR_3 and the other sample point being a boundary pixel of the rectangular projection face SEG_EQ. As shown in the sub-diagram (B) of FIG. 22, each horizontal interpolation is performed upon one sample point being a pixel of the second padding region PR_2 which is located on the boundary of the third padding region PR_3 and the other sample point being a pixel of the third padding region PR_3 which is located on the boundary of the second padding region PR_2. As shown in the sub-diagram (C) of FIG. 22, each horizontal interpolation is performed upon one sample point being a boundary pixel of the second circular projection face R_SP and the other sample point being a boundary pixel of the rectangular projection face SEG_EQ. As shown in the sub-diagram (D) of FIG. 22, each horizontal interpolation is performed upon one sample point being a boundary pixel of the second circular projection face R_SP and the other sample point being a pixel of the third padding region PR_3 which is located on the boundary of the second padding region PR_2.

Figure 23:
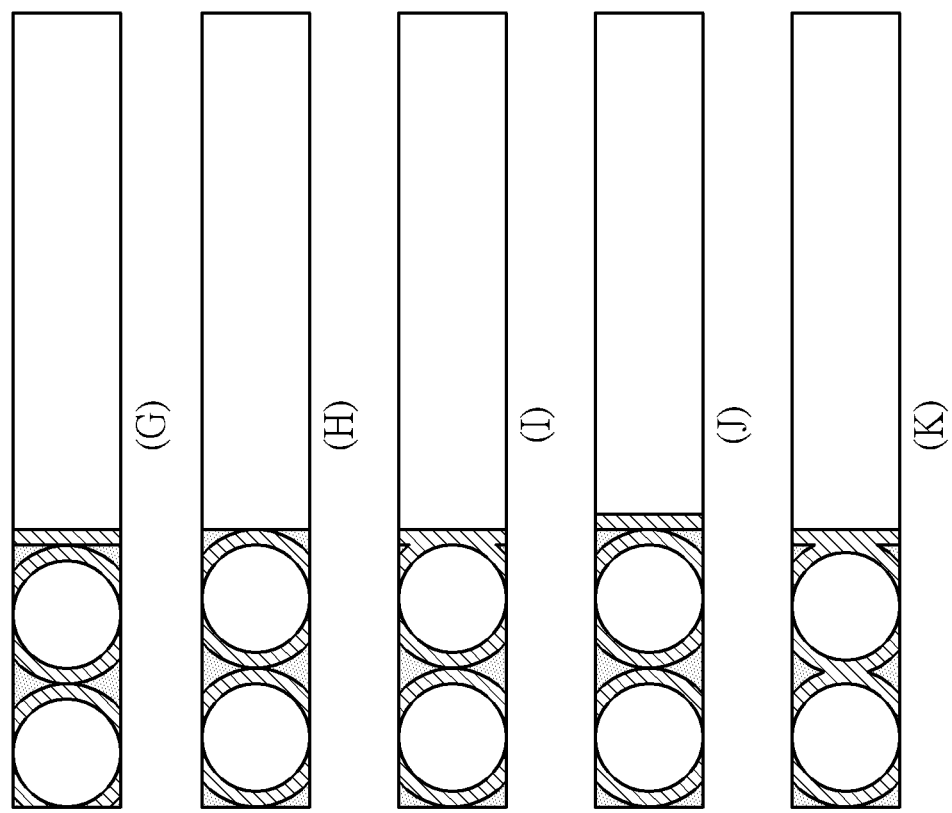
FIG. 23 is a diagram illustrating several examples of an SSP layout with padding according to an embodiment of the present invention.
Figure 23:
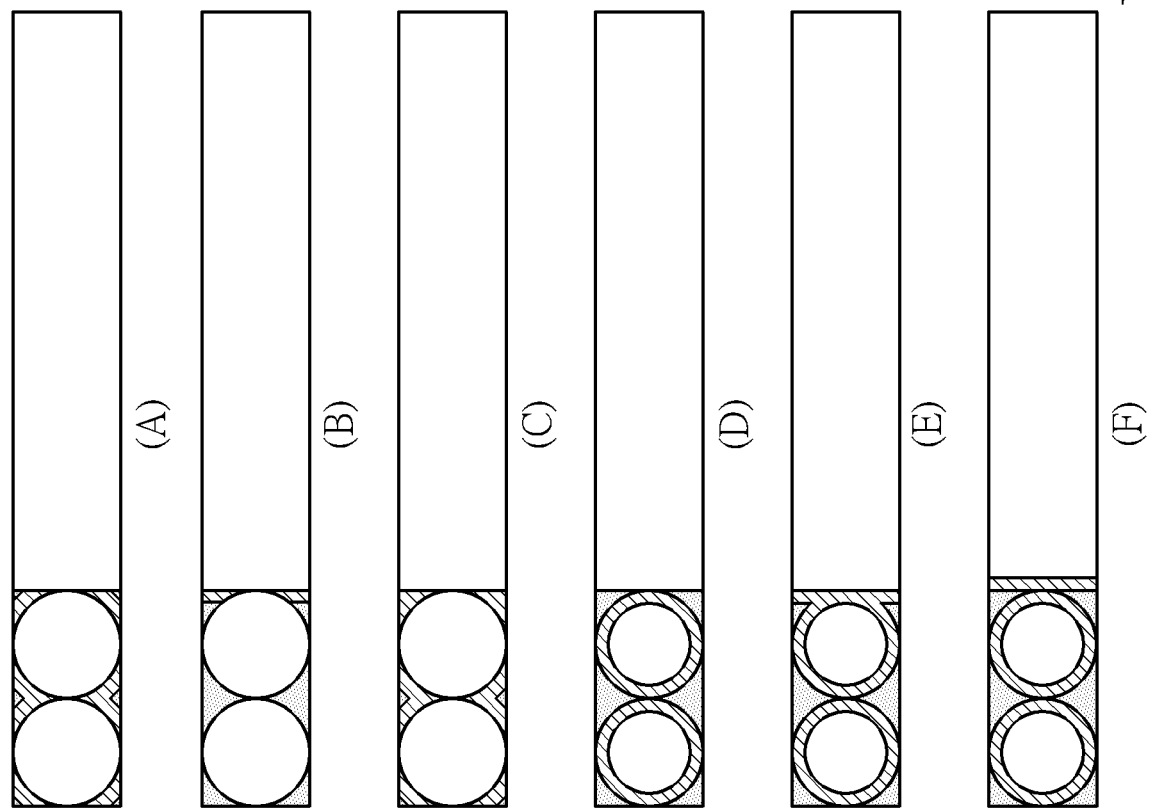

In the aforementioned SSP layouts, each of the first circular projection face R_NP, the second circular projection face R_SP and the rectangular projection face SEG_EQ has a padding region. In one alternative SSP layout design, only one of the first circular projection face R_NP, the second circular projection face R_SP and the rectangular projection face SEG_EQ has a padding region. In another alternative SSP layout design, only two of the first circular projection face R_NP, the second circular projection face R_SP and the rectangular projection face SEG_EQ have padding regions. In addition, the padding size $S_{PD}$ is not limited to be equal to or larger than the guard band size $S_{GB}$, depending upon the actual design considerations. Further, padding close to the boundary of the projection-based frame IMG may be unnecessary. Hence, a circular projection face maybe fully enclosed by an associated padding region, or may be partially enclosed by the associated padding region. Based on the above observation, several examples of an SSP layout with padding are illustrated in FIG. 23.

As shown in FIG. 3, a surface of the sphere 200 is partitioned into a north polar region 306 centered at the north pole 302, a south polar region 310 centered at the south pole 304, and a single non-polar ring-shaped segment (e.g., an equatorial segment) 308 between the north polar region 306 and the south polar region 310. Alternatively, the surface of the sphere 200 may be partitioned into two polar regions and multiple non-polar ring-shaped segments.

Figure 24:
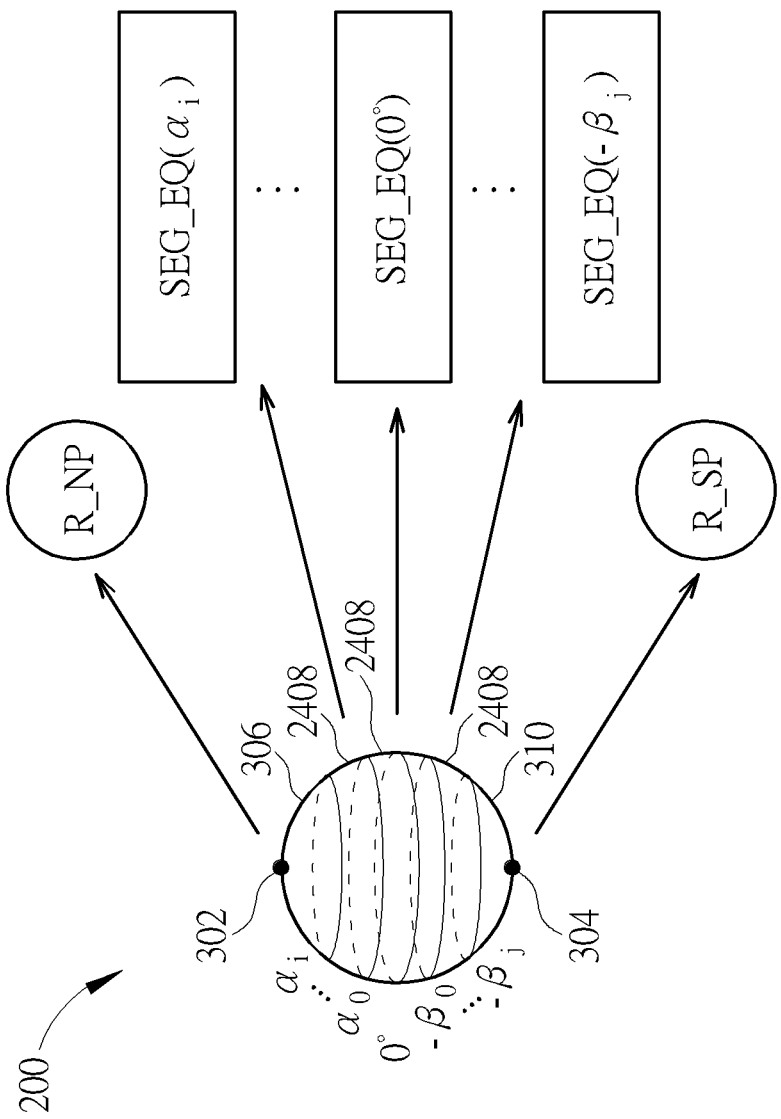
FIG. 24 is a diagram illustrating a second segmented sphere projection (SSP) format according to an embodiment of the present invention.

FIG. 24 is a diagram illustrating a second segmented sphere projection (SSP) format according to an embodiment of the present invention. The surface of the sphere 200 is partitioned into a north polar region 306 centered at the north pole 302, a south polar region 310 centered at the south pole 304, and a plurality of non-polar ring-shaped segments (e.g., equatorial segments) 2408 between the north polar region 306 and the south polar region 310. A latitude of an equator of the sphere 200 is 0°. As shown in FIG. 24, the lowest latitude of the north polar region 306 is $+\alpha_i$, and the highest latitude of the south polar region 310 is $-\beta_j$. Regarding the north hemisphere, one non-polar ring-shaped segment 2408 is defined by latitudes 0° and $+\alpha_0$, another non-polar ring-shaped segment 2408 is defined by latitudes $+\alpha_0$ and $+\alpha_1$, and so on. Regarding the south hemisphere, one non-polar ring-shaped segment 2408 is defined by latitudes 0° and $-\beta_0$, another non-polar ring-shaped segment 2408 is defined by latitudes $-\beta_0$ and $-\beta_1$, and so on. In accordance with the proposed SSP format, the north polar region 306 of the sphere 200 is projected/mapped onto a first circular projection face R_NP, the south polar region 310 is projected/mapped a second circular projection face R_SP, and the non-polar ring-shaped segments 2408 are projected/mapped onto a plurality of rectangular projection faces SEG_EQ $(\alpha_i)$, . . . , SEG_EQ (0°), . . . SEG_EQ $(-\beta_j)$, respectively.

In one exemplary design, the north polar region 306 is flatten into the first circular projection face R_NP via equal-angular projection, the south polar region 310 is flatten into the second circular projection face R_SP via equal-angular projection, and the non-polar ring-shaped segments 2408 are mapped onto the rectangular projection faces SEG_EQ$(\alpha_i)$, . . . , SEG_EQ (0°), . . . SEG_EQ$(-\beta_j)$ via equal-area projection. However, these are for illustrative purposes only, and are not meant to be limitations of the present invention. In some embodiments of the present invention, one or both of the first circular projection face R_NP and the second circular projection face R_SP may has an equal-angular projection format or an equal-area projection format, and each of the rectangular projection faces SEG_EQ $(\alpha_i)$, . . . , SEG_EQ (0°), . . . SEG_EQ $(-\beta_j)$ may have an equirectangular projection format or an equal-area projection format. Moreover, non-uniform mapping may be involved in the segmented sphere projection applied to the omnidirectional image/video content S_IN' of the sphere 200.

After the first circular projection face R_NP, the second circular projection face R_SP and the rectangular projection faces SEG_EQ$(\alpha_i)$, . . . , SEG_EQ (0°), . . . SEG_EQ $(-\beta_j)$ are obtained by the conversion circuit 114, the conversion circuit 114 employs the selected SSP layout L_SSP for packing the first circular projection face R_NP, the second circular projection face R_SP and the rectangular projection faces SEG_EQ ($\alpha_i$), ..., SEG_EQ (0°), ... SEG_EQ ($-\beta_j$).

The SSP layout L_SSP may be any arrangement of two circles (i.e., first circular projection face R_NP and second circular projection face R_SP) and multiple rectangles (i.e., rectangular projection faces SEG_EQ ($\alpha_i$), ..., SEG_EQ (0°), ... SEG_EQ ($-\beta_j$)). The aforementioned padding and/or guard bands maybe applied to at least one of the first circular projection face R_NP, the second circular projection face R_SP and the rectangular projection faces SEG_EQ ($\alpha_i$), ..., SEG_EQ (0°), ... SEG_EQ ($-\beta_j$). Further, padding close to the boundary of the projection-based frame IMG may be unnecessary. Since a person skilled in the pertinent art can readily understand details of padding and guard bands after reading above paragraphs, further description is omitted here for brevity.

Figure 25:
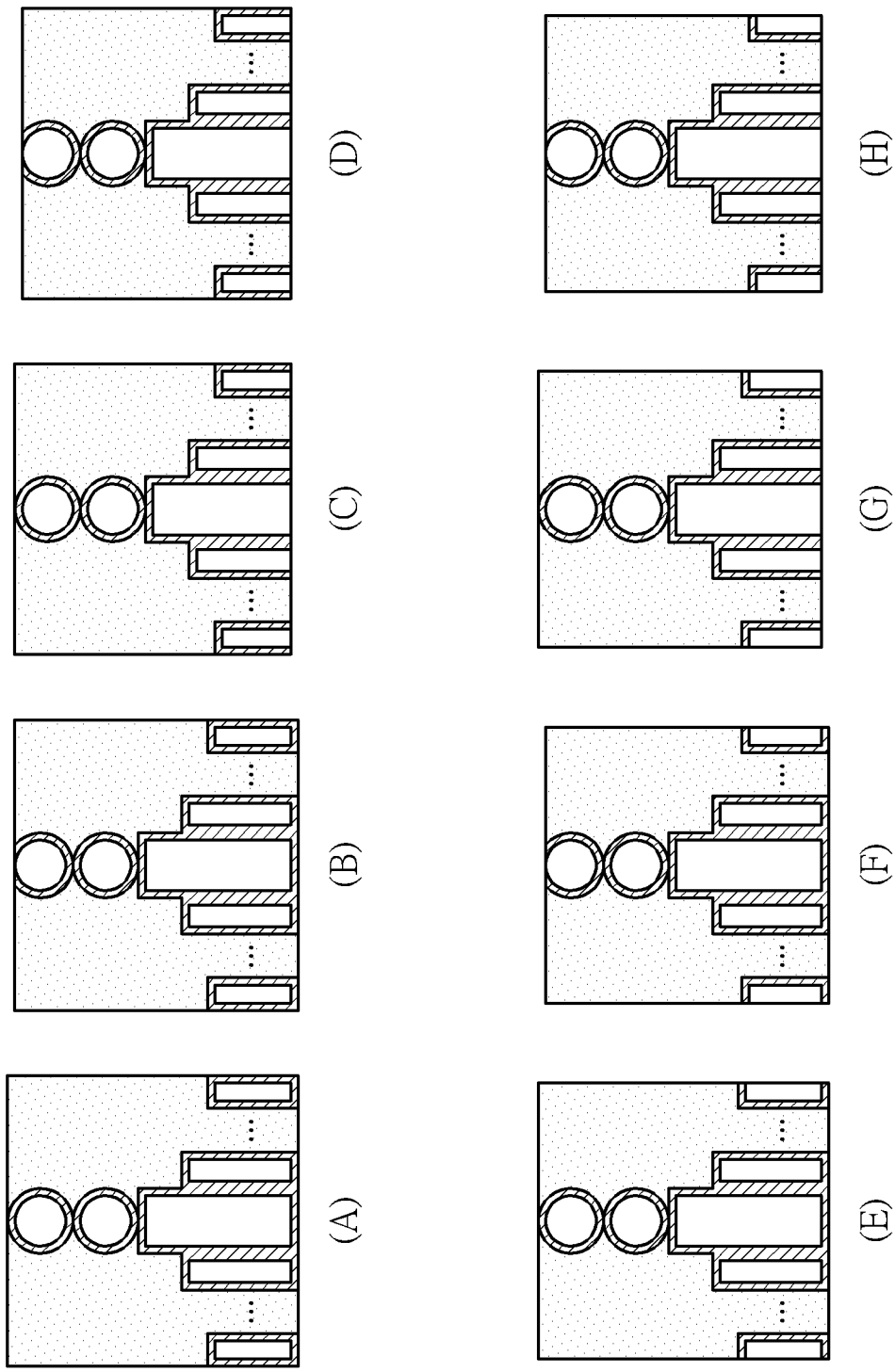
FIG. 25 is a diagram illustrating several examples of an SSP layout with padding which has two circles stacked in the top middle of a projection-based frame according to an embodiment of the present invention.

FIG. 25 is a diagram illustrating several examples of an SSP layout with padding which has two circles stacked in the top middle of a projection-based frame according to an embodiment of the present invention. The middle rectangular projection face is SEG_EQ (0°), and centers of the first circular projection face R_NP, the second circular projection face R_SP and the rectangular projection face SEG_EQ (0°) are aligned vertically in a height direction of the projection-based frame IMG.

Figure 26:
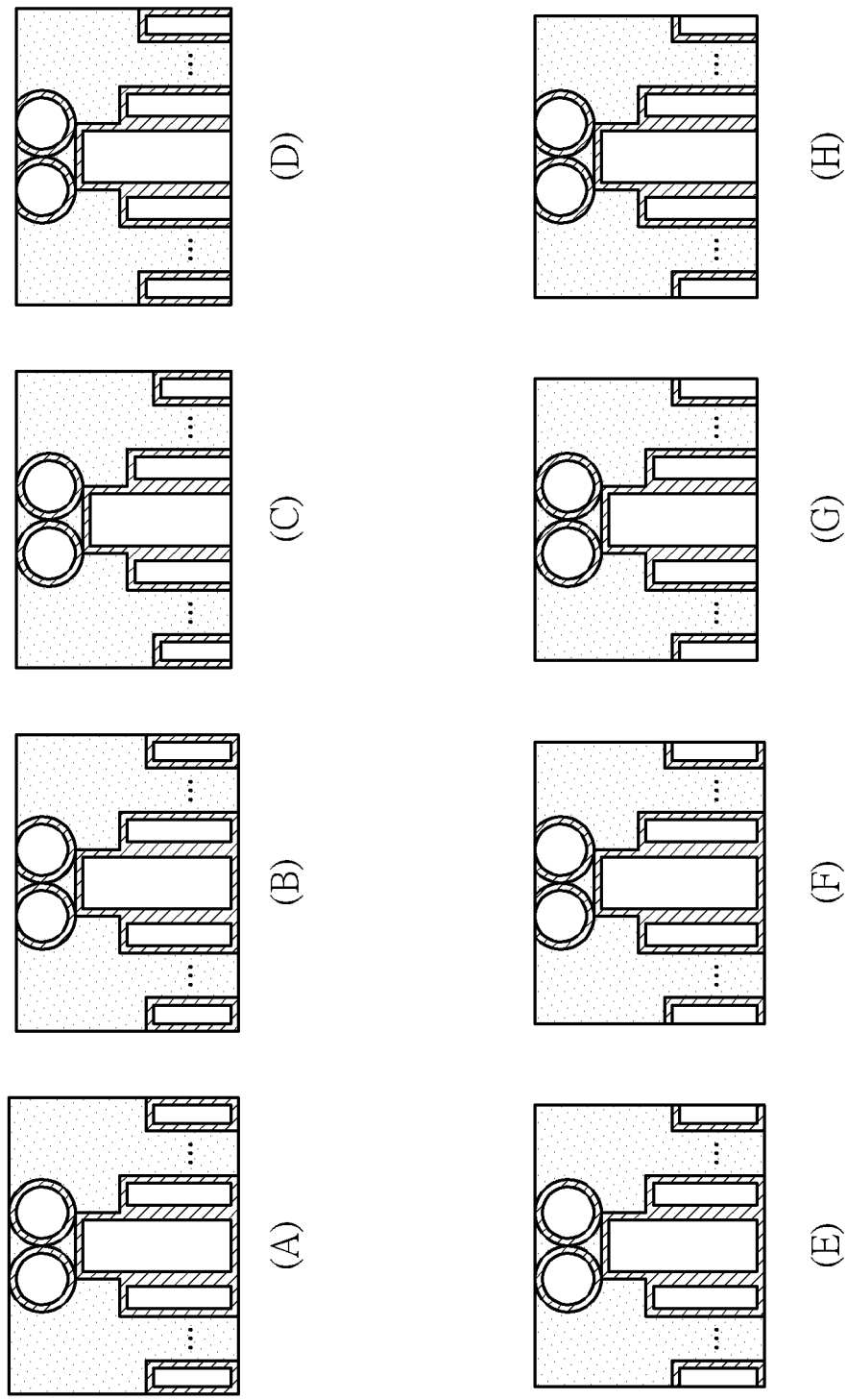
FIG. 26 is a diagram illustrating several examples of an SSP layout with padding which has two circles placed side by side in the top middle of a projection-based frame according to an embodiment of the present invention.

FIG. 26 is a diagram illustrating several examples of an SSP layout with padding which has two circles placed side by side in the top middle of a projection-based frame according to an embodiment of the present invention. The middle rectangular projection face is SEG_EQ (0°), the first circular projection face R_NP and the second circular projection face R_SP are placed on the same side of the rectangular projection face SEG_EQ (0°), and centers of the first circular projection face R_NP and the second circular projection face R_SP are aligned horizontally in a width direction of the projection-based frame IMG.

Figure 27:
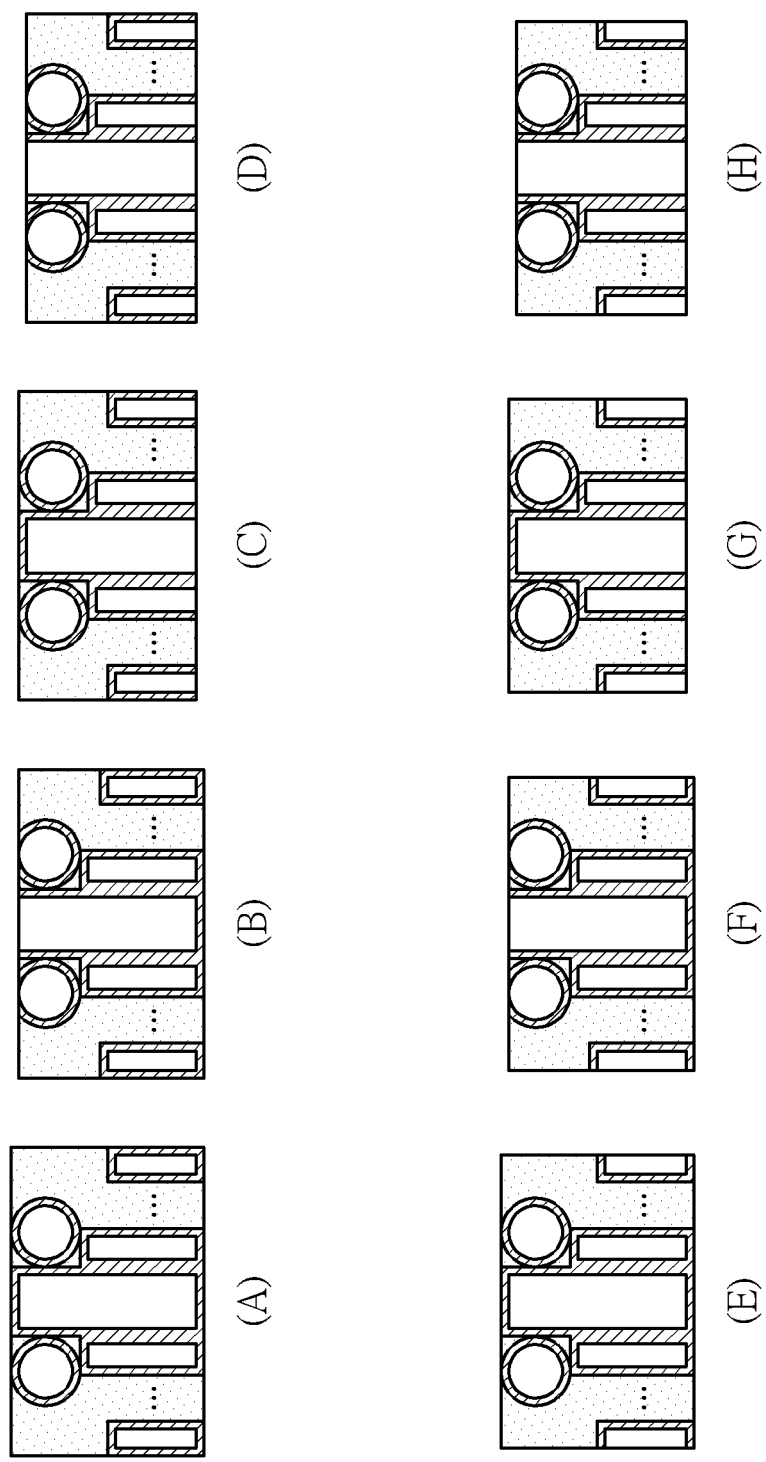
FIG. 27 is a diagram illustrating several examples of an SSP layout with padding which has two circles placed on a left side and a right side of the top middle of a projection-based frame according to an embodiment of the present invention.

FIG. 27 is a diagram illustrating several examples of an SSP layout with padding which has two circles placed on the left side and the right side of the top middle of a projection-based frame according to an embodiment of the present invention. The middle rectangular projection face is SEG_EQ (0°), the first circular projection face R_NP and the second circular projection face R_SP are placed on opposite sides of the rectangular projection face SEG_EQ (0°), and centers of the first circular projection face R_NP and the second circular projection face R_SP are aligned horizontally in a width direction of the projection-based frame IMG.

The projection-based frame IMG to be encoded is required to be rectangular. If the SSP layout L_SSP is set by one of the exemplary SSP layouts shown in FIGS. 25-27 for creating the projection-based frame IMG, the projection-based frame IMG is required to have dummy areas (e.g., black areas, gray areas, or white areas) filled in the projection-based frame IMG. For example, each dummy area represented by a dotted area in FIGS. 25-27 consists of non-active pixels that are not displayable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
   receiving an omnidirectional content corresponding to a sphere;
   generating at least one padding region;
   generating a projection-based frame according to at least the omnidirectional content and a segmented sphere projection (SSP) format, wherein the projection-based frame has a 360-degree content represented by a first circular projection face, a second circular projection face, and at least one rectangular projection face packed in an SSP layout, a north polar region of the sphere is mapped onto the first circular projection face, a south polar region of the sphere is mapped onto the second circular projection face, and at least one non-polar ring-shaped segment between the north polar region and the south polar region of the sphere is mapped onto said at least one rectangular projection face; and
   encoding, by a video encoder, the projection-based frame to generate a part of a bitstream;
   wherein the SSP layout further comprises said at least one padding region, said at least one padding region comprises a first padding region, the first padding region connects with one boundary of a first projection face that is one of the first circular projection face, the second circular projection face and said at least one rectangular projection face; and
   wherein generating said at least one padding region comprises:
   deriving pixel values of pixels included in the first padding region from duplication of pixel values of pixels included in the first projection face.

2. The video processing method of claim 1, wherein a lowest latitude of the north polar region is +45°, and a highest latitude of the south polar region is −45°.

3. The video processing method of claim 1, wherein the north polar region of the sphere is mapped onto the first circular projection face via equal-angular projection, the south polar region of the sphere is mapped onto the second circular projection face via equal-angular projection, and said at least one non-polar ring-shaped segment of the sphere is mapped onto said at least one rectangular projection face via equal-area projection.

4. The video processing method of claim 1, further comprising:
   applying content rotation to the omnidirectional content of the sphere;
   wherein generating the projection-based frame according to the omnidirectional content and the SSP format is performed after the omnidirectional content of the sphere is rotated by the content rotation.

5. The video processing method of claim 1, wherein when the first circular projection face and the second circular projection face are packed in the SSP layout, a space is left directly between the first circular projection face and the second circular projection face, such that the first circular projection face does not connect with the second circular projection face.

6. The video processing method of claim 1, wherein when said at least one rectangular projection face and one of the first circular projection face and the second circular projection face are packed in the SSP layout, a space is left directly between said at least one rectangular projection face and said one of the first circular projection face and the second circular projection face, such that said at least one rectangular projection face does not connect with said one of the first circular projection face and the second circular projection face.

7. The video processing method of claim 1, wherein the first projection face is one of said at least one rectangular projection face, the first padding region does not connect with another side of the first projection face, said one side of the first projection face and said another side of the first projection face are opposite sides of the first projection face, the first projection face comprises a partial region, the partial region comprises boundary pixels at said another side of the first projection face, the first padding region is generated by duplicating the partial region, and there is an image content continuity boundary between the first padding region and the first projection face packed in the SSP layout.

8. The video processing method of claim 1, wherein said at least one padding region further comprises a second padding region, the second padding region connects with one boundary of a second projection face that is another of the first circular projection face, the second circular projection face and said at least one rectangular projection face, and the first padding region and the second padding region are packed in the SSP layout without overlapping.

9. The video processing method of claim 1, wherein said at least one padding region further comprises a second padding region, the second padding region connects with one boundary of a second projection face that is another of the first circular projection face, the second circular projection face and said at least one rectangular projection face, and the first padding region and the second padding region are packed in the SSP layout with overlapping.

10. The video processing method of claim 9, wherein a pixel value of a pixel included in an overlapping region resulting from packing of the first padding region and the second padding region is directly set by a pixel value of a padding pixel included in a padding region selected from the first padding region and the second padding region.

11. The video processing method of claim 10, wherein when a pixel included in the overlapping region is nearer to a non-overlapping region of the first padding region than a non-overlapping region of the second padding region, the pixel value of the pixel included in the overlapping region is directly set by a pixel value of a co-located padding pixel included in the first padding region; and when the pixel included in the overlapping region is nearer to the non-overlapping region of the second padding region than the non-overlapping region of the first padding region, the pixel value of the pixel included in the overlapping region is directly set by a pixel value of a co-located padding pixel included in the second padding region.

12. The video processing method of claim 10, wherein pixel values of all pixels included in the overlapping region are set by pixel values of co-located padding pixels included in a same padding region.

13. The video processing method of claim 9, wherein a pixel value of a pixel included in an overlapping region resulting from packing of the first padding region and the second padding region is set by blending pixel values of different pixels.

14. The video processing method of claim 13, wherein the different pixels comprise a pixel of one of the first projection face and the second projection face.

15. The video processing method of claim 13, wherein the different pixels comprise a pixel of one of the first padding region and the second padding region.

16. The video processing method of claim 1, wherein said at least one rectangular projection face comprises a first rectangular projection face; and the first circular projection face and the second circular projection face are both located on a same side of the first rectangular projection face.

17. The video processing method of claim 1, wherein said at least one rectangular projection face comprises a first rectangular projection face; and the first circular projection face and the second circular projection face are located on opposite sides of the first rectangular projection face, respectively.

18. A video processing apparatus comprising:
a conversion circuit, arranged to receive an omnidirectional content corresponding to a sphere, and generate a projection-based frame according to the omnidirectional content and a segmented sphere projection (SSP) format, wherein the projection-based frame has a 360-degree content represented by a first circular projection face, a second circular projection face, and at least one rectangular projection face packed in an SSP layout, a north polar region of the sphere is mapped onto the first circular projection face, a south polar region of the sphere is mapped onto the second circular projection face, at least one non-polar ring-shaped segment between the north polar region and the south polar region of the sphere is mapped onto said at least one rectangular projection face, and the conversion circuit comprises:
a padding circuit, arranged to generate at least one padding region; and
a video encoder, arranged to encode the projection-based frame to generate a part of a bitstream;
wherein the SSP layout further comprises said at least one padding region, said at least one padding region comprises a first padding region, the first padding region connects with one boundary of a first projection face that is one of the first circular projection face, the second circular projection face and said at least one rectangular projection face; and
wherein the padding circuit is arranged to derive pixel values of pixels included in the first padding region from duplication of pixel values of pixels included in the first projection face.

* * * * *